United States Patent [19]

McCarty et al.

[11] Patent Number: 4,739,242

[45] Date of Patent: Apr. 19, 1988

[54] MULTISTATION MODULAR CHARGING SYSTEM FOR CORDLESS UNITS

[75] Inventors: George W. McCarty, Lutherville; Somers H. Smith, III, Columbia, both of Md.

[73] Assignee: Solid State Chargers Research and Development Limited Partnership, Lutherville, Md.

[21] Appl. No.: 860,805

[22] Filed: May 8, 1986

Related U.S. Application Data

[63] Continuation-in-part of Ser. No. 682,195, Dec. 17, 1984, Pat. No. 4,591,777.

[51] Int. Cl.⁴ .................... H02J 7/00; H01M 10/46
[52] U.S. Cl. .............................. 320/2; 320/15; 320/21; 310/50; 30/DIG. 1
[58] Field of Search ..................... 320/2–5, 320/15, 21; 429/96–100; 30/DIG. 1; 310/50

[56] References Cited

U.S. PATENT DOCUMENTS 4,591,777  5/1986  McCarty et al. ............... 320/15 X Primary Examiner—R. J. Hickey
Attorney, Agent, or Firm—Leonard Bloom

[57] ABSTRACT

A multistation charging system is provided for charging batteries within a plurality of cordless tools, appliances or the like, each of which has at least one rechargeable battery therein. A plurality of modules, which act as charging stations, are arranged substantially adjacent to one another. Normally closed pairs of conductive contacts are provided in each of the modules. The electrical pairs of contacts in the modules are connected in a series circuit arrangement with each other. On one of the modules, electrical connection is provided to a single current regulated solid-state charging device which produces charging current pulses. The device may alternatively be in the one module. Each of the modules removably supports a respective tool or appliance and each tool or appliance has means for electrically connecting the respective battery therein within the series circuit arrangement and in series therewith only one wall outlet or a.c. power connection is required. Any combination of batteries per tool or appliance and any number of tools or appliances may be provided. Any number of the modules may be unoccupied. The modules are of standard construction, allowing charging of batteries or cells within many different tools and appliances provided with standardized connections.

37 Claims, 14 Drawing Sheets

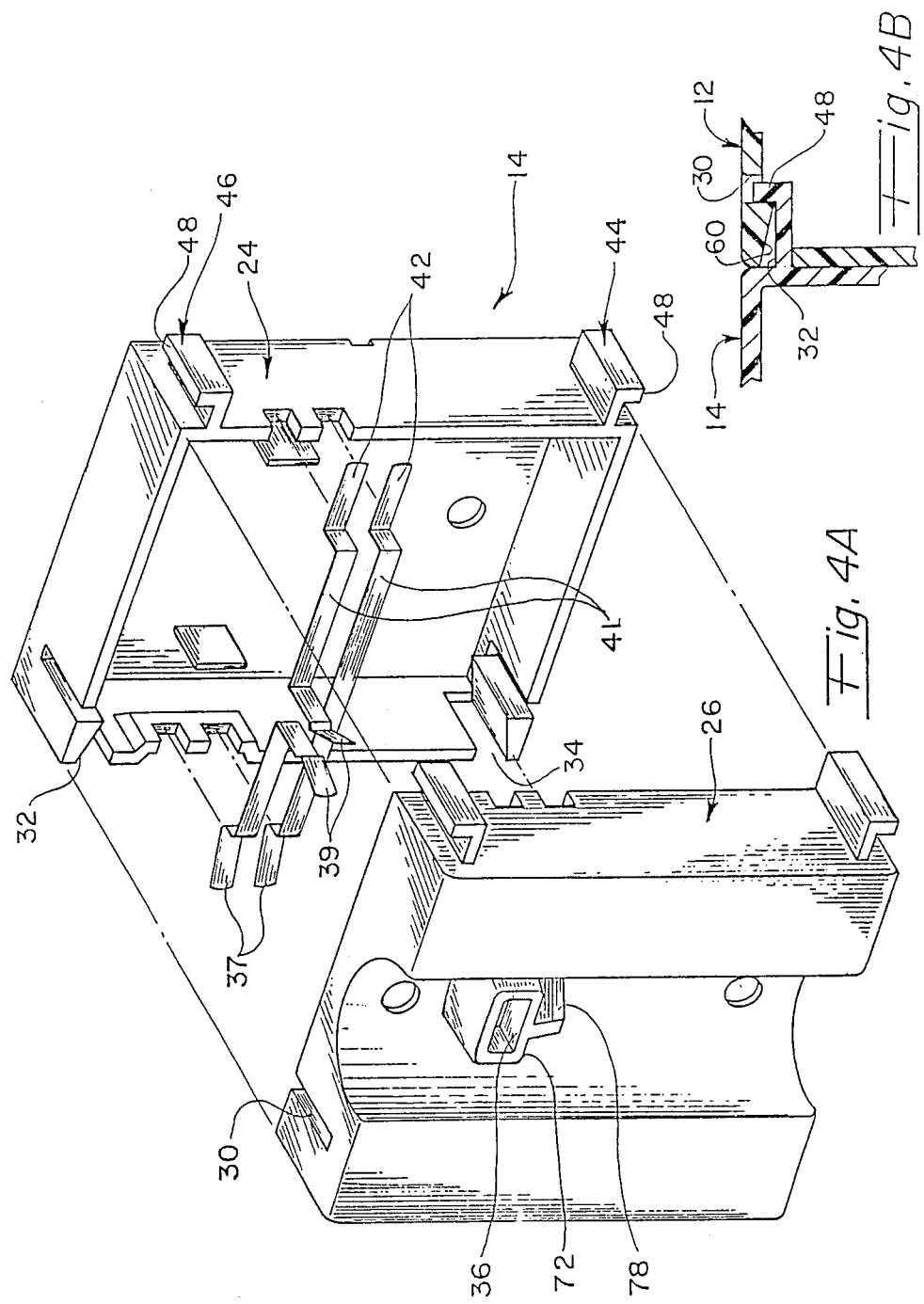

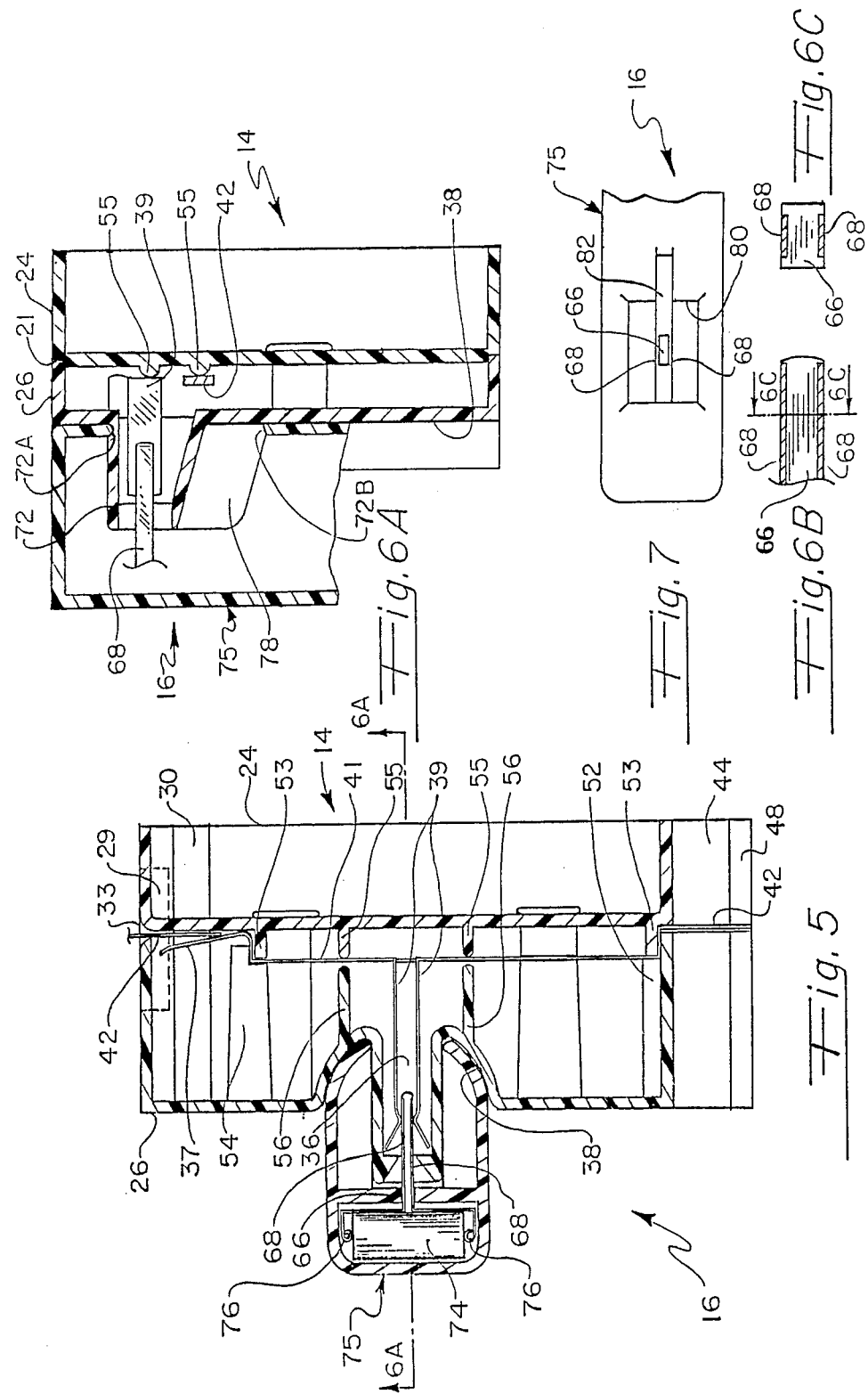

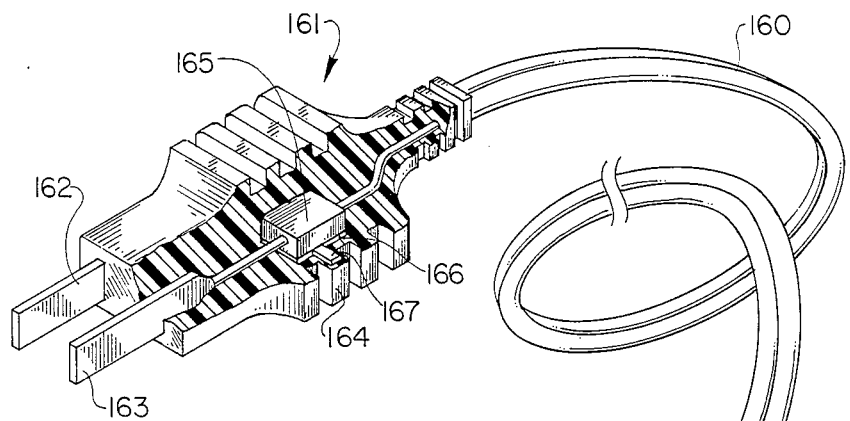
Fig. 16A
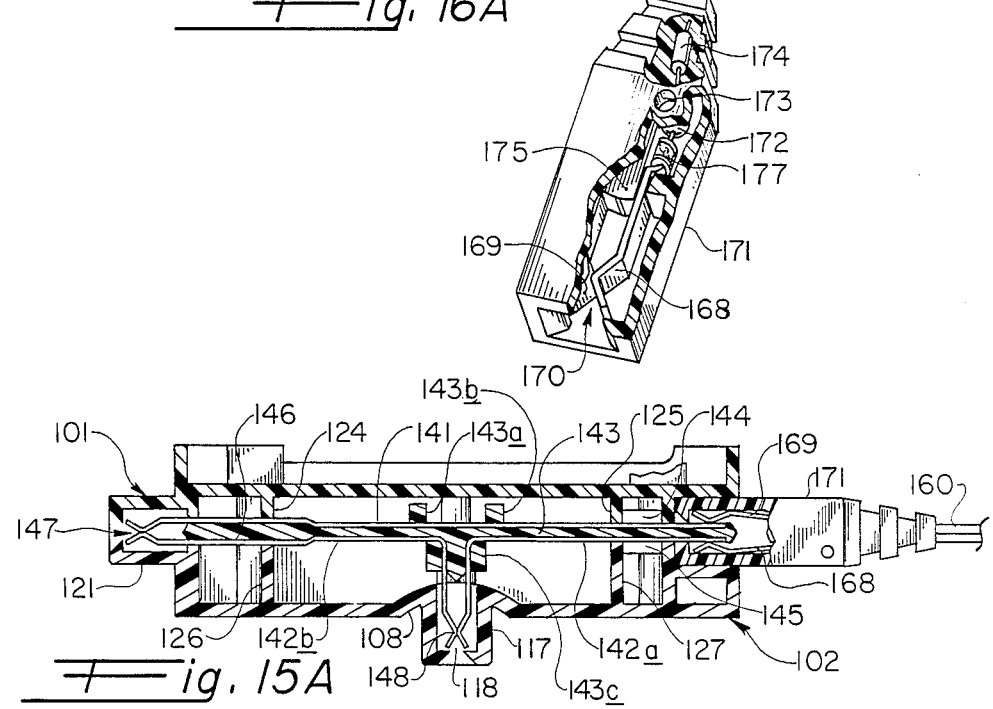
Fig. 15A
Fig. 15B

MULTISTATION MODULAR CHARGING SYSTEM FOR CORDLESS UNITS

CROSS-REFERENCE TO RELATED APPLICATION

This application is a continuation-in-part of application Ser. No. 682,195 of George W. McCarty et al. entitled "Multistation Modular Charging System for Cordless Tools and Appliances" and filed Dec. 17, 1984, now U.S. Pat. No. 4,591,777 the disclosure of which is incorporated herein in its entirety by reference.

BACKGROUND OF THE INVENTION

The present invention relates to charging systems for battery operated, cordless tools, appliances and the like. Normally such devices are connected to a single tool or appliance for recharging via an a.c. power source. In other instances the tool or appliance carries its own recharging device together with a suitable cord for connecting it to a power source.

In today's household where a growing dependency on power tools and appliances is clearly in evidence, there is a need for storing such appliances in an orderly fashion, usually in a storage closet or in a kitchen, workshop area, garage, basement or the like. Since in many cases such tools and appliances are hung on a rack-like device or stored in an array of compartments or trays, the need for recharging such devices in an orderly and simple manner is desirable, especially if all of such appliances and tools can be charged at the same time by a common means or system in which selected tools or appliances can be removed for use without affecting the charging operation of the remaining tools and appliances and, further, wherein additional tools and appliances can be added into the charging system without changing that system.

SUMMARY OF THE INVENTION

It is a primary purpose and object of the present invention to address the aforementioned needs and therefore provide a multistation modular charging system for a plurality of cordless devices, such as tools, battery power packs, appliances and the like.

Other and ancillary objects of the present invention have for their purpose to provide a multistation modular charging system for charging a plurality of battery operated cordless devices, such as tools, appliances and the like in which the multistation modular charging system can be expanded upon or reduced by a desired number of modules, and in which each module within an array of modules cooperates with a cordless tool, appliance, battery power pack or the like to be charged as an independent unit so that a selected device can be removed from the array without affecting the charging operation of the batteries in the remaining devices. Further, the modules making up the system according to the present invention are, in a preferred realization, substantially identical to each other and are simple in design so as to afford ease and economy in their fabrication and simplicity in their operation, and the modules are virtually maintenance free. Further, each module can be marketed as a separate item associated with a particular appliance, tool, battery power pack or the like and be incorporated into a user's system. In addition the system may be easily mounted on a wall or suspended from a shelf or cabinet, for example, using six modules for a single a.c. outlet.

The invention provides, as well, for manufacturing standardization in the fabrication of the multistation modular charging system, thus enabling a high-volume low-cost production both for the charging system and the cordless device handles used in conjunction with the charger. Such standardization does not preclude, however, the custom design of a particular module and/or cordless device and/or its handle.

The invention can be seen as a multistation modular charging system for charging a plurality of units, each of which has at least one rechargeable battery and at least one electric contact means therein for conducting d.c. current to the at least one rechargeable battery. The charging system includes an electrically conductive series circuit having a plurality of normally closed pairs of contacts in electrical series with each other, a power source and a charging means receiving current from the power source. The charging means is connected to the electrically conductive series circuit. A plurality of modules including circuitry for completing the electrically conductive series circuit is provided, each of the modules having therein at least one pair of the plurality of normally closed pairs of contacts. Each of the units has a respective one of the at least one electrical contact means connected to the respective at least one rechargeable battery therein. Each of the modules is provided with a releasable connection means for incorporating the respective electrical contact means of the respective units, when the units are in place, into the electrically conductive series circuit via respective pairs of the normally closed pairs of contacts by effecting opening thereof. At least all of the modules other than the last module of the plurality of modules has a respective further normally closed pair of contacts and at least all of the modules other than the first of the plurality of modules has further contact means for engaging a respective one pair of the further normally closed pairs of contacts in an adjacent one of the modules. Rechargeable batteries within the units may be placed in series with said electrically conductive series circuit and each other to be charged by the d.c. current flowing in the series circuit.

The invention can also be viewed as a multistation modular charging system for charging a plurality of cordless devices such as tools, appliances or other battery powered units from a power source. The system includes a base module, a line cord associated with the base module, and means for connecting the line cord to the power source. A solid state charging device is electrically connected to the line cord and the power source and generates a plurality of charging current pulses. First spring contact means are carried by the base module. Support means on the base module releaseably supports a first cordless device, the last-named means including means for electrically engaging the first spring contact means to receive charging current for charging batteries or battery within the first cordless device. At least one satellite module is positioned laterally of the base module. Means are included for mechanically supporting the satellite module on the base module. Second spring contact means are carried by the satellite module and are in electrical series with the first spring contact means. Further spring contact means in each of the modules completes the series circuit. Means are included on the satellite module for supporting a second cordless device, the last-named means including means for electrically engaging the second spring contact means to receive charging current for charging the second cordless device.

From a different vantage point, the invention is a multistation modular charging system for charging a plurality of cordless devices such as tools, appliances or other battery powered units and which includes a base module, means for supporting the base module on a wall or other surface and charging means associated with the base module. A plurality of substantially identical satellite modules and means for removably connecting one of the satellite modules to the base module laterally thereof are provided. Means are included for removably securing the remaining satellite modules to each other and to the one satellite module and hence to the base module, in sequence, and progressively laterally thereof in a direction away from the base module. Respective contact means in the base module and in each of the satellite modules include a respective pair of spring contacts normally engaging one another. Further contact means in each of the modules connect the first respective contact means in series with each other as the satellite modules are connected sequentially to each other and to the base module and for completing the series circuit. Support means are provided on the base module and on the satellite modules, respectively, for supporting the respective cordless devices. A conductive means carried by each of the cordless devices is adapted to engage and to be received between the respective spring contacts in electrical engagement therewith when the respective cordless device is supported on the base module or on one of the satellite modules. The cordless devices may be charged simultaneously by the charging means. All of the cordless devices are charged in electrical series.

In another aspect, the invention is a multistation modular charging system for charging a plurality of cordless devices such as tools, appliances or other battery powered units from a power source and includes a plurality of modules, at least some of which are substantially identical. Connecting means removably connect the modules together in sequence. Electrical contact means are provided within each of the modules. A respective pair of normally closed spring contacts are provided in each of the modules for serially connecting the respective electrical contact means as the modules are connected together, adjacent ones of the modules having cooperating mechanical securing means adapted to engage each other as the respective electrical contact means are serially connected. Charging means are electrically connected between the power source and the electrical contact means on at least one of the modules. Support means on each module support a respective cordless device. Each of the electrical contact means includes a pair of additional normally closed spring contacts. Conductive rod means carried by each of the cordless devices engages and is received between the respective additional normally closed spring contacts in electrical engagement therewith when the respective cordless device is supported on a selected one of the modules.

The invention can be seen as a multistation modular charging system for charging a plurality of cordless devices such as tools, appliances or other battery powered units from a power source which includes a base module having a line cord associated therewith and connected to the power source. A charging device is operatively associated with the base module. Storing means on the base module store an excess portion of the line cord. Support means support a first cordless device having a first electrically conductive means therein to carry d.c. charging current to at least one rechargeable battery therein on the base module. First electrical contact means in said base module provide a conductive d.c. current path between the charging device and the first electrically conductive means in the first cordless device. A satellite module and means for mounting the satellite module on the base module are included. Second electrical contact means in the satellite module provide a conductive d.c. current path. A pair of normally closed spring contacts are provided in the base module. A pair of fixed contacts in the satellite module engage and spread the pair of normally closed spring contacts for connecting the second electrical contact means in electrical series with the first electrical contact means and with the charging device operatively associated with the base module. Support means support a second cordless device having a second electrically conductive means therein to carry d.c. charging current to at least one rechargeably battery therein. Electrical connection means within said base module and within said satellite module provide a series connection between the second electrical contact means within the satellite module and the second electrical contact means within the base module.

The invention can also be viewed as being a combination in a multistation charging system for charging a plurality of units from an alternating current source, each of the units having at least one rechargeable battery therein. The combination includes a plurality of charging stations arranged substantially adjacent to one another, respective first normally closed electrical contact means in each of the charging stations and means including respective second normally closed electrical contact means in each of said charging stations for connecting the first normally closed respective electrical contact means in all of the adjacent charging stations in an electrically conductive series circuit with each other. Conducting means operatively associated with one of the charging stations connects the electrically conductive series circuit including the respective electrical contact means therein to the current source, the last-named means including a charging device having a current regulating circuit and generating a series of charging current pulses. Support means on each of the charging stations removably support a respective one of the plurality of units. Connecting means on each unit electrically connect the respective battery therein within the electrically conductive series circuit and in series therewith and in series with other batteries within the series circuit.

The invention can also be considered as a combination in a multistation charging system for charging a plurality of units from an alternating current source, each of the units having at least one rechargeable battery therein. The combination includes a plurality of charging stations arranged substantially adjacent to one another. Electrical contact means are provided in each of the charging stations; a respective pair of normally closed spring contacts in each of the stations connect the respective electrical contact means in the adjacent charging stations in a series circuit arrangement with each other. Connecting means on one of the charging stations connect the respective electrical contact means therein to the current source, the last-named means includes a solid-state charging device having a current regulating circuit and generating a series of current pulses. Support means on each of the charging stations removably support a respective unit. Connection means on each unit electrically connect the respective at least one rechargeable battery therein within the series circuit arrangement. Each of the units is a cordless battery-powered device having a substantially cylindrical handle, the support means removably supporting a respective unit includes at each of the charging stations a scalloped recess formed therein for receiving the handle of the cordless device. A protruding boss is formed on the recess, the handle having a complementary recess formed therein for receiving the boss. Connecting means on each unit electrically connect the respective at least one rechargeable battery therein within the series circuit arrangement includes a rod carried by the handle within the recess therein, a pair of conductive strips being provided on the rod. Connection means electrically connect the respective battery between the pair of conductive strips. The electrical contact means in the respective charging station includes a pair of substantially parallel conductive strips, one of the pair of strips comprising respective elements normally engaging one another and resiliently biased towards each other. The rod is inserted between the respective elements such that the conductive strips on the rod engage the respective elements.

In another aspect, the invention is a modular system for charging batteries in cordless devices such as tools or the like, the system including housing means having a plurality of shaped recesses formed therein. A plurality of cordless devices, each of which has a shaped portion adapted to be received in the respective recesses are supported therein. At least one battery is provided in each of the devices. Each of the shaped portions has an opening therein. A respective boss is associated with each of the recesses and is adapted to be received within a respective opening in a respective shaped portion to removably support a respective cordless device within its associated recess in the housing means. Respective pairs of spaced apart contacts within each of the shaped portions are associated with its respective opening therein. A respective pair of normally closed contacts are associated with a respective boss in each of the respective recesses in the housing means, such that when the shaped portion of a respective cordless device is removably received within one of the respective recesses in the housing means, the respective boss fits within the respective opening in the shaped portion. The respective spaced apart contacts spring the contacts of a respective said normally closed pair of contacts apart and engage these contacts in electrical series therewith. Connecting means electrically serially connect the pairs of normally closed contacts. Current regulated charging means supply a series of battery charging current pulses to the serially connected normally closed pairs of contacts in the housing. Batteries within the devices may receive, via the spaced apart contacts, the charging current pulses and become recharged.

In a further aspect the invention is a modular system for cordless devices such as tools or the like and includes a housing, the housing having a plurality of substantially identical recesses formed therein. A plurality of cordless devices, each of which has a handle portion adapted to be received interchangeably in the respective recesses, are supported therein. A battery is housed in each of the handles, which have an opening therein. A protuberance is associated with each of the recesses and is adapted to be received within the opening of a respective handle, thereby removably supporting the respective cordless device within its recess in the housing. First spaced contacts carried by each of the handles are associated with its respective opening therein. Second normally closed contacts are associated with the protuberance in the respective recess in the housing, such that when the handle of a respective cordless device is removably received within the recess in the housing, the protuberance fits within the opening in the handle. The first spaced contacts spring the second normally closed contacts apart and engage these second contacts in electrical series therewith. Connecting means serially connect the respective second contacts in the plurality of recesses in the housing. Current regulated charging means supply a series of battery charging pulses to the serially connected second contacts in the housing.

From another vantage point the invention can be seen as a modular system for cordless battery powered devices, the system including housing means having a plurality of substantially identical recesses formed therein. A corresponding plurality of cordless devices are removably and interchangeably mountable in the respective recesses. Supporting means mechanically supports the devices within the recesses. Charging means associated with the system deliver a series of charging current pulses. The charging means includes current regulating means for regulating d.c. charging current. Contact means independent of the mechanical supporting means establishes electrical contact between the charging means and the respective devices when the devices are received within the respective recesses in the housing means. Connecting means within the housing means connect the devices in electrical series within.

The foregoing objects of the present invention, as well as others which are to become apparent from the text below taken in conjunction with the accompanying drawings, are achieved by the present invention.

BRIEF DESCRIPTION OF THE DRAWINGS

FIG. 4A is a front exploded view of a satellite module.

FIG. 4B is a detailed view of the latching means connection.

FIG. 5 is a section view, taking across the lines 5—5 of FIG. 1A, a satellite module in an operative engagement with the handle of a cordless device, and further showing an extension member on the cordless device supporting the contact elements in the module and making electrical engagement therewith.

FIG. 6A is a sectional view taken along the lines 6A—6A in FIG. 5.

FIG. 6B is an enlarged portion of the extension or rod member on the cordless device.

FIG. 6C is a section view, taken across the line 6C—6C of FIG. 6B.

FIG. 7 is a plan view of a portion of the handle of a cordless device.

FIG. 13A is a pictorial view of a preferred embodiment of a modular charger unit, which can be used interchangeably as a base unit or satellite unit, in multistation charging systems in accordance with a preferred embodiment of the present invention.

FIG. 13B is a plan view of the back half of the modular charger unit shown in FIG. 13A, as seen from the inside.

FIG. 13C is a plan view of the front half of the modular charger unit shown in FIG. 13C, as seen from the inside.

FIG. 15A is a cross-sectional view of the modular charger unit shown in FIG. 13A, the section being taken along section line 15A—15A, to illustrate the electrical circuit components within the modular unit.

FIG. 15B is a front view of a portion of the unit illustrated in FIG. 15A, partially broken away to expose current carrying circuit components.

FIG. 16A is a pictorial representation of a preferred resistive line cord and associated plugs, which are illustrated in section to expose internal circuit components to view.

GENERAL DESCRIPTION OF THE PREFERRED EMBODIMENT

Figure 1A:
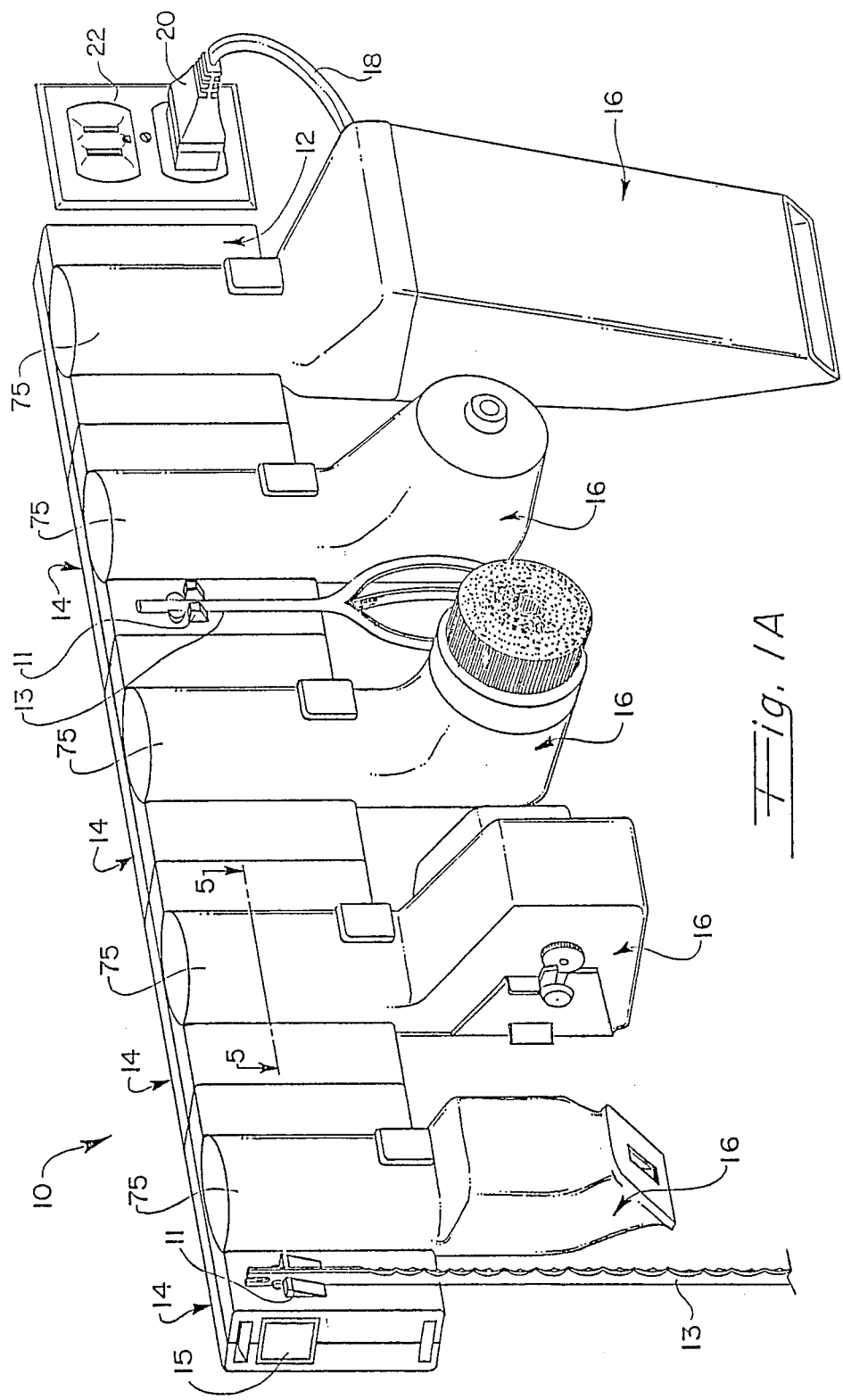
FIG. 1A is a perspective view of a first embodiment of the present invention in an assembled form ready for operation, showing a plurality of individual cordless tools or appliances mounted upon the multistation modular units of the charging system.

Referring to FIG. 1A, there is shown an assembled multistation modular charging system 10 arranged on a wall surface, not shown. A base modular charger unit 12 is shown at the right of the figure, and a plurality of satellite modular charger units 14 are shown connected in a linear array extending to the left from the base unit 12. Connected to each of the modular units including the base unit is a battery-operated power tool, appliance, or other cordless device 16 having a handle 75, as shown, which not only will be stored when not in use but will receive a charge from the modular charging system 10 according to the invention. Additionally, supports 11 may be provided on the modules for holding tool parts 13 and the like. A circuit-closing end plug 15 completes the series circuit formed by all the modules. Also shown is a power cord 18 connected to the base modular unit 12, having a plug member 20 for cooperation with a suitable a.c. outlet receptacle 22. The line cord 18 is preferably a resistive line cord, which advantageously be composed of two relatively thin, nichrome wires helically wound about heat-resistance cores formed of respective bundles of heat-resistance fibers. It should be understood that the base modular unit 12 may be positioned at the left of the figure and the modular satellite units 14 can extend therefrom to the right. In this case the cooperative parts to be described below will be reversed, that is, form a mirror image with respect to the former arrangement in the respective charger modular housings. If the a.c. outlet 22 is positioned to the left of the array constituting the charging system 10, as shown, and the system 10 extends to the left as well then the power cord can be neatly secured under the array by means of suitable clips, not shown, depending from the respective housings 14.

As shown in FIG. 1A, and from left to right therein, the cordless products may consist (for example) of an electric knife, a can opener, a polisher or scrubber, a mixer, and a vacuum cleaner. These cordless products are primarily intended for kitchen use; however, the present invention is equally applicable to a wide variety of cordless devices or separable battery power packs for use in the home or workshop or for industrial or commercial usage.

Figure 1B:
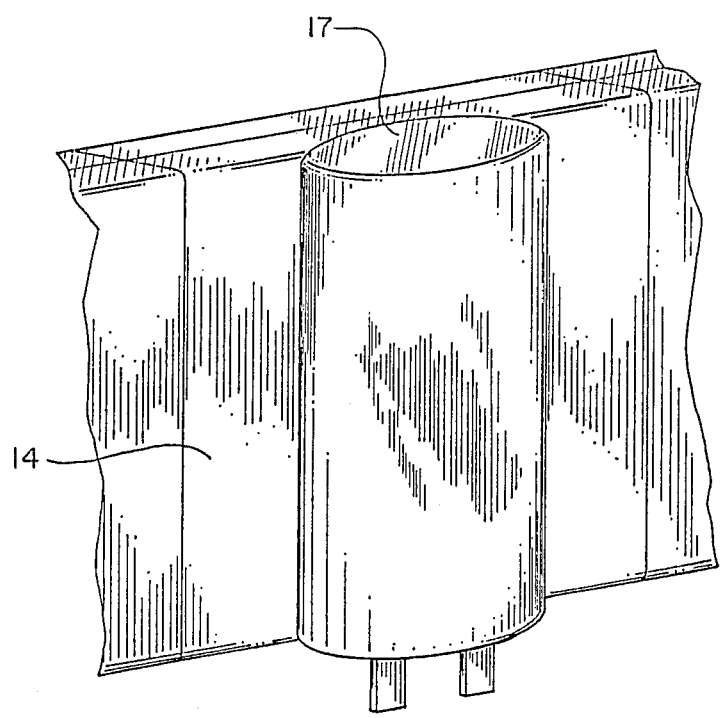
FIG. 1B is a perspective view, corresponding to a portion of FIG. 1A, but showing one of the modular units for charging a separate battery power pack as distinguished from a cordless tool or appliance.

In FIG. 1B, the multistation system 10 is shown supporting a battery power pack device 17, which is normally used as a power source in other cordless appliances and tools.

Figure 2:
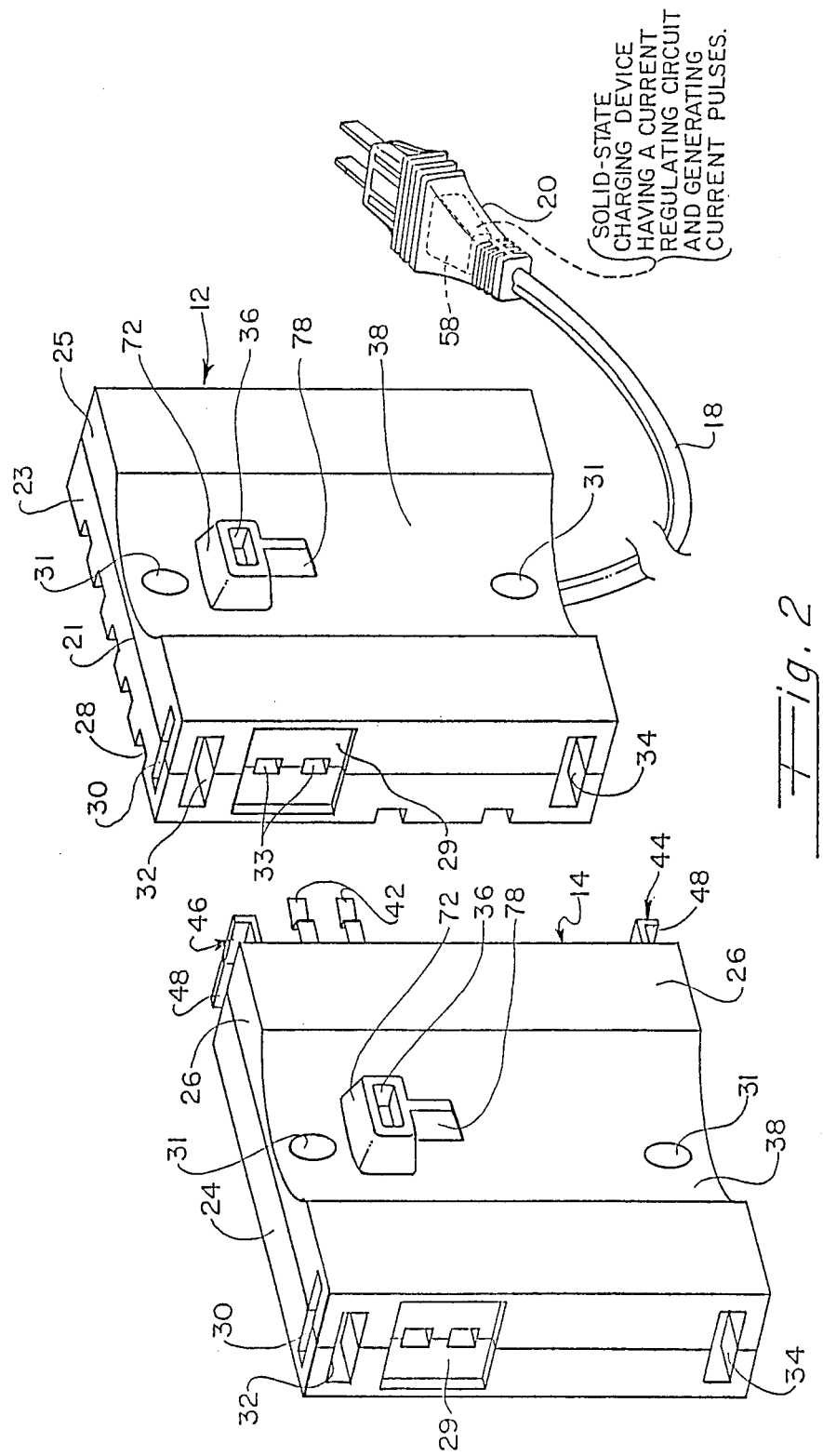
FIG. 2 is a perspective view of one of the modular satellite units separated from the base modular unit.

In FIG. 2 the base modular unit 12 and one of the satellite modular units 14 are shown in greater detail. The base modular unit comprises two housing parts 23 and 25 which form a "clamshell" type of housing in which complementary mating portions of the two housing parts join at a common mid-plane 21 parallel to the front and rear faces of the respective housing parts. The rear housing part 23 is provided with notches 28 around its perimeter to provide ventilation openings for cooling purposes. Additionally, the cord 18 can emanate from any one of the notches 28 at any desired location on the perimeter of the base charger module. The front housing 25 has access holes 31 therein to allow suitable fastener means (such as screws or "Molly" bolts) to secure the unit to a wall surface. Within a scalloped portion 38 of the face plate or front housing 25 is a further opening 36 for receiving an extension member from the tool or appliance, to be described in detail below. At the left side of the base modular unit 12, as shown, are a pair of spaced apart slots 32, 34 at the top and bottom, respectively, which cooperate respectively with a slot 30 and a similar slot (not visible in FIG. 2) in the bottom wall. Between these slots 32, 34, located in the upper portion of the unit, is another pair of slots 33 arranged within a recessed portion 29 in a vertical alignment (see also FIG. 1A).

The satellite modular unit 14 also has two housing parts 24, 26, and the face plate portion has access holes 31 and an opening 36 in a shaped portion 38 thereof, similar to that described above for the base modular unit 12. To the left of the satellite module, the slot construction is shown to be similar to that described for the base unit 12, there being provided spaced apart slots 32, 34, and in between these the slots 33 vertically aligned along the mid-plane between the two housing parts 24 and 26. To the right of the module 14 there is shown extending from the top and bottom portions, respectively, a pair of tongue members 44, 46, having detent portions 48, and in between these a pair of contact prong members 42 adapted to engage the slots 33 of an adjacent module.

Thus, the tongue member 46 is designed to enter the slot 32, and the tongue member 44 is designed to enter the slot 34, in order to secure the satellite module 14 in removable locking engagement with the base modular unit 12, which feature will be described in greater detail below. Also shown in FIG. 2 is a current pulse producing, current regulated battery charging-circuit in a component 58 housed within the power plug 20. The charging circuit component 58 may also be mounted within the base modular unit 12 or within the cord 18, if desired, and is arranged to generate a series of pulses for charging the batteries in the respective cordless tools, appliances or the like. The charging device 58 is preferably a solid-state charging device produced as an integrated circuit (or "I.C.") and constitutes a current regulating circuit for generating a series of current pulses, each of which is less than half of the alternating current waveform. An example of a suitable circuit for producing these pulses is disclosed and claimed in the co-pending Holland application, Ser. No. 643,299, filed Aug. 22, 1984, entitled "CURRENT PULSE PRODUCING CIRCUIT", and assigned (by Mesne Assignment) to the assignee of the present invention, the disclosure for which is incorporated herein in its entirety by reference.

Figure 3:
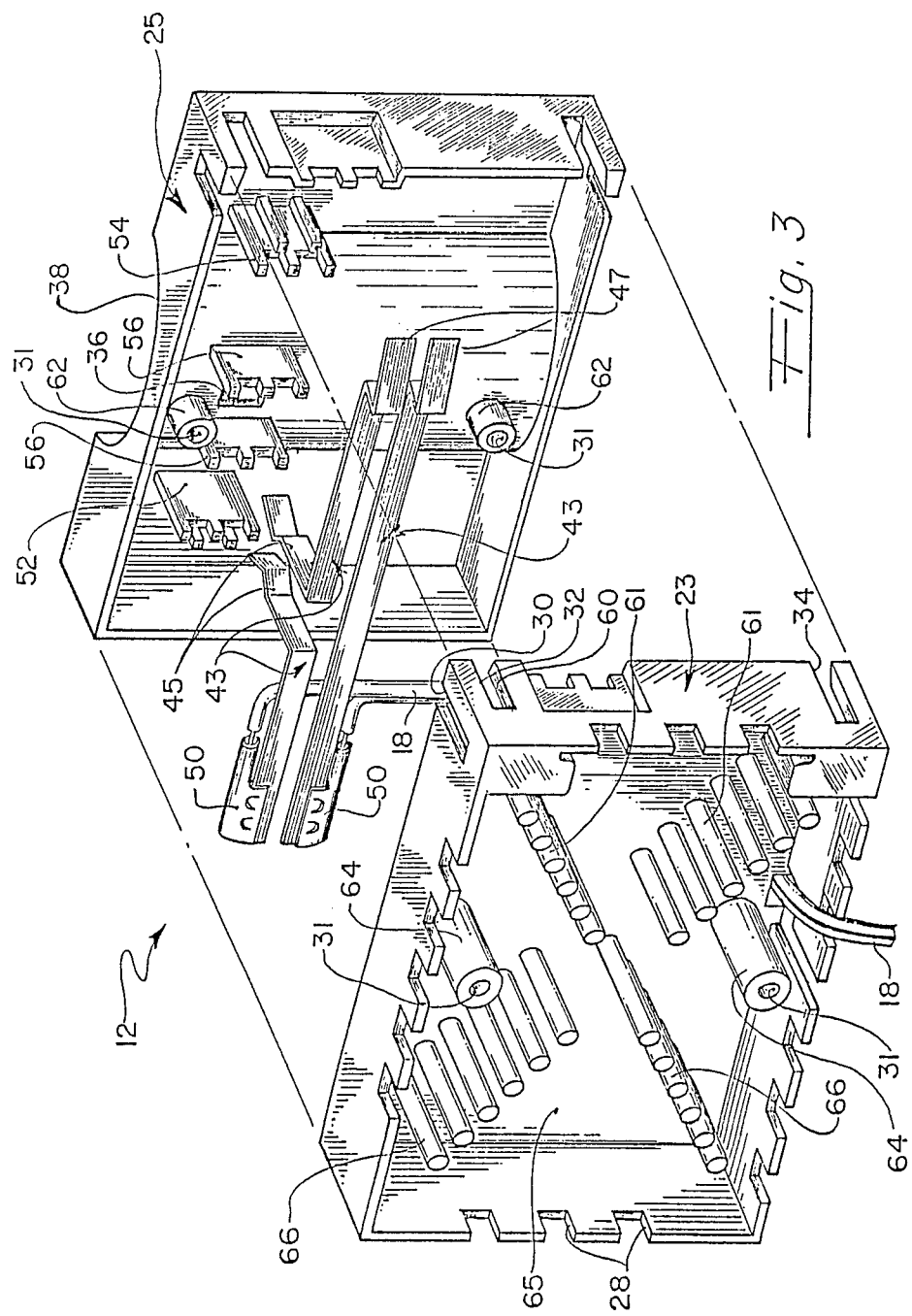
FIG. 3 is a rear exploded view of the base modular unit, the rear housing part being laterally reversed to show the cord storage means therein.

In FIG. 3 the base modular unit is shown with the two housing parts 23, 25 separated from each other in order to show the contact members or busses 43. These contact members or busses 43 comprise a parallel pair of ribbon-like strips of conductive material, brass, for example, in which the upper member is shown to have a break therein defined by two laterally extending prong members constituting a normally closed pair of contacts 45. Each prong member is resiliently biased towards the other and is provided with an indented portion normally in contact with one another. The power supply cord 18 is shown to have suitable contact slide members 50 for engaging the respective ends of the contact strips 43, while the other ends which define a normally open pair of contacts 47 are bent or biased away from the longitudinal axes of the strips 43, having upturned end portions which provide a contact receiving surface in the proximity of the slots 33 formed in the side of the housing part 25 within the recess 29. In order to secure or trap the contact strips within the housing, upstanding slotted members or lands 52, 54 and 56 are provided within the interior of the housing 23, as shown, as well as corresponding lands (not shown) in the housing 23, and preferably are molded integrally with the housing from a suitable plastic material. Contact strips or busses 43, when positioned by the lands 52, 54, 56, allow the normally closed pair of contacts (prongs) 45 to enter the opening 36 in their normally contact-closing position. Busses 62 are molded within the front housing part 25 and cooperate with bosses 64 molded within the rear housing part 23, thereby providing the access holes 31 for mounting the base modular unit 12. The rear housing part 23 has a face plate 65, which is provided with a series of upstanding post members 61 forming a generally X-configuration. These posts 61 are so spaced apart from each other so as to allow the power cord 18 to be wrapped around the various posts in order to take up any excess slack in the cord when in use. Also shown on the right side of the housing part 23 are the slots 32, 34. Each of these slots, as shown more clearly in FIG. 4B, is provided with a sloped portion 60, the inner edge of which defines a detent portion. The corresponding detent portions 48 of the respective tongue member 44, 46 extending from a satellite module snap past the sloped surface 60 of the respective recesses 32, 34 for locking engagement when the modules 12 or 14 (or two of the same modules 14) are fitted together. An access hole 30 is provided adjacent each detent portion 60 so that the detent 48 can be depressed for disassembly, as best shown in FIG. 4B.

In FIG. 4A there is shown an exploded view of one of the satellite modules 14 showing the arrangement of the contact strips or busses 41. The upper strip is broken at the middle portion, similar to the contact strip or busses 43 in the base module 12, and defines therefor laterally projecting prongs 39, similar to prongs defining the pair of contacts 45 in the base module 12, adapted to be received within the opening 36 on the front face of the housing part 26. The strips or busses 41 have extending contact prongs defining the pair of contacts 42 at one end thereof, and at the other end thereof there are bent portions or receiver prongs defining a pair of contacts 37. The contact strips are fitted to lands or slotted members contained within the front housing part 26 in the same manner as described and shown in FIG. 3 for the base module 12. When two satellite modules are fitted together, the extension prongs constituting the pair of contacts 42 of one module will enter the slots 33 of the adjacent module and thereby slide past and come in contact with the receiver prongs constituting the pair of contacts 37 within that particular module, while at the same time, of course, the tongue member 46, 48 lockingly engage their respective slots 32, 34, as previously described.

In FIG. 5 the handle 75 of a tool or appliance is shown fitted into the scalloped portion 38 of a typical satellite module 14. As shown, the handle 75 includes a generally recessed portion 80 (see FIG. 7) which fits over the boss or protuburance 72 having the opening 36 therein (see also, FIGS. 2, 3, 7 and 8).

The handle 75 may be provided with suitable guide ribs (shown in FIG. 5) for facilitating the sliding movement of the handle over the protruding boss 72. The top surface of the boss 72 may be generally horizontal, while the bottom surface may be tapered as shown more clearly in FIG. 6A. The top and bottom surfaces of the boss 72 may be provided with indentations 72A and 72B, respectively, so that the corresponding respective edges of the handle may ride along the top and bottom surfaces of the boss 72 and may then be received into the respective indentations with a detent or "snap action", thereby removably retaining the handle 75 of the cordless device 16 on the respective charging module (12 or 14).

Centrally positioned within the recess 80 and extending from a non-conductive block member 74, is a non-conductive extension or rod member 66 having conductive strips or contacts 68 on either side thereof as shown more clearly in FIGS. 6B and 6C. The rod member 66 acts to separate the leaves or prongs 39 or 45 (depending on which module is being used) which are normally in contact with one another and thereby places each of the prongs 39 or 45 in contact with a respective contact strip 68 on either side of the rod member 66, as shown. The contact strips 68 extend, respectively, to either side of the block 74 and make contact with suitable conductive posts 76 associated with the battery, not shown, in the tool or appliance 16. Also, the contact strips 41 are shown secured in place by lands 52, 54, 56 in the front housing 26 and corresponding lands or supports 53, 55, in the rear housing 24 of each module. When both front and rear housings are joined by heat welding methods, the aforesaid lands or supports become juxtaposed by virtue of their respective locations to trap and hence secure the strips 41 therebetween.

FIG. 6A shows the handle 75 of the tool or appliance 16 in position within the scalloped portion 38 of the satellite module 14. The protrusion 72 together with the flange 78 (see FIGS. 2 and 4A) are received in the recess of the handle of the cordless device 16.

In FIG. 7, the handle is shown separately in a plan view wherein the rod member 66 with the contact strips 68 on either side thereof is shown in a central position with respect to the recess 80. The slotted area 82 extending from the recess 80 is designed to slide past the flange 78, as best shown in FIGS. 4A and 6A.

Figure 8:
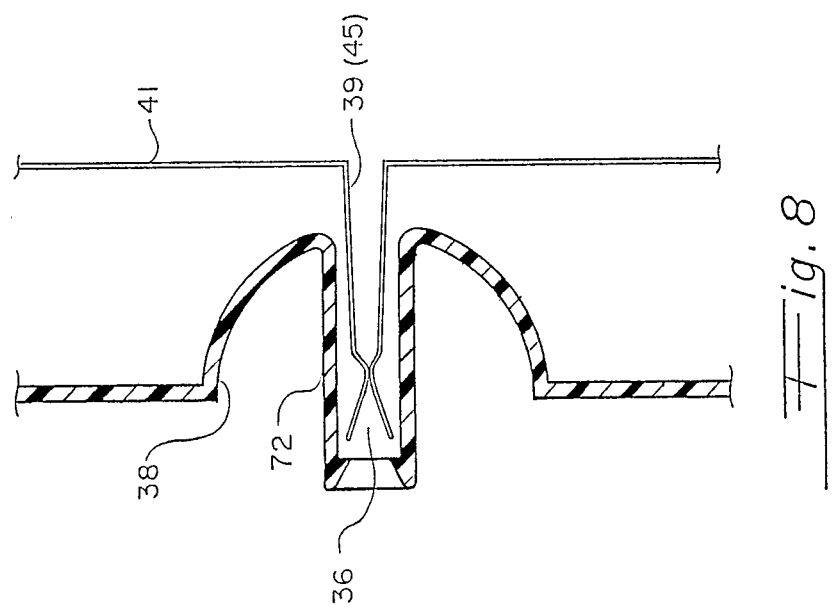
FIG. 8 is a portion of FIG. 5, drawn to an enlarged scale, and showing the resiliently biased contact elements in their normally closed position.

FIG. 8 is a top view illustrating the removal of the handle of the tool or appliance 16 from the modules 12 and 14. In such cases the prongs constituting contacts 45 (or 39) will close on one another, thus closing the circuit for that module from which the tool is removed.

Figure 9:
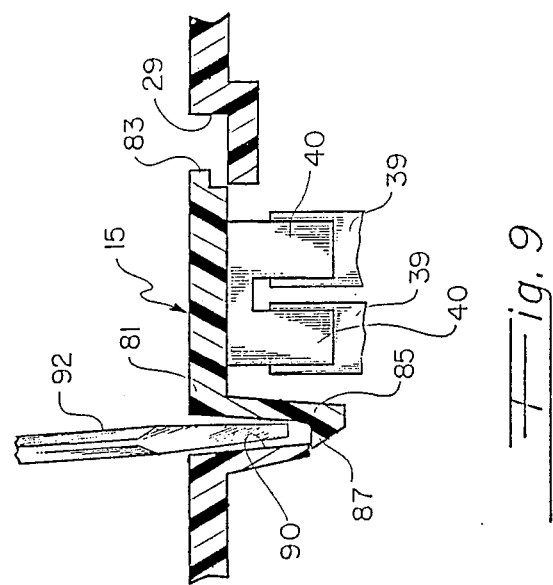
FIG. 9 is a detailed view of the circuit-closure plug for the system according to the invention.

In FIG. 9 the circuit-closure plug 15 is shown having a pair of conductive closure contacts 40 extending from its base 81 in order to make contact with the respective prongs constituting contacts 39 in a module housing (or respective contacts 45 in a base module). The plug 15 fits neatly into the recess 89 in the side of each module for that purpose. The base 81 of the plug 15 is provided with a flange portion 83 on one side thereof and an extended flange 85 having a detent portion 87 on the opposite side thereof. The detent 87 slides down a corresponding flange or sidewall 90 of the associated module and snaps past the edge thereof to make a locking engagement. Meanwhile the flange 83 of the base 81 allows the plug 15 to be seated within the recess 29 as shown. Because the dimensions of the base 81 are smaller than that of the recess 29, a space will be provided on both sides of the base to allow a screwdriver 92 or the like to be inserted therein in order to pry loose the detent 87 for the purpose of removing the plug 15. It will be understood that the plug 15 can be inserted into any one of the modules, including the base module.

When the multistation modular charging system according to the invention is assembled, as shown in FIG. 1A, the satellite modules 14 will be locked together in the manner already described with the respective pairs of contacts 37, 42 making contact through the slots 33, as shown at the top of FIG. 5, including the plug 15. If a tool or appliance 16 is in place, that is, its handle secured to the module, as shown in FIGS. 1 and 5, the rod member 66 will separate the normally closed prong contacts 39, putting each of these in contact with the contact strips 68 associated with the battery charging circuit of the cordless tool or appliance, as shown in FIG. 5. The tool or appliance will then be recharged while it is in its stored position.

Should the tool or appliance be removed for use elsewhere, the pair of contacts 39 (or pair of contacts 45 if the base module is in use) will resume their usually closed position, thereby maintaining a closed circuit. It will be understood from the above that the series circuit defined by the conductor strips or busses 41 in the satellite modules 14, strips or busses 43 in the base module 12, and closure contacts 40 in the plug 15 are continuously in series; that is, the circuit is never broken by removing either one or all of the tools or appliances from the multistation array 10, since the contacts 39 (or 45) are in contact with contacts 68 on the rod member 66 of the associated tool or appliance, or they are in contact with each other. Further, as cordless tools or appliances are added to the system, they can be introduced into the multistation charger 10 by simply adding on a satellite module 14. Also, a preferred embodiment of the present invention simplifies the battery charging circuit by needing only one battery charging circuit 58 for up to as many as six battery operated cordless devices to be charged, or, on the other hand, up to as much as 24 cells in a cell-holder device or devices. This particular arrangement avoids the necessity of having a separate battery charging circuit for each tool or appliance or, in the case of separate charging stations, at each battery charging station. Whenever no tool, appliance, battery power pack or the like is present on the modules, all of the prongs 39 and 45 are closed, causing a metallic, conductive short circuit across the current pulse producing circuit 58; nevertheless, no damage is done because of the impedance of the circuit 58, which limits the magnitude of the current.

Figure 11:
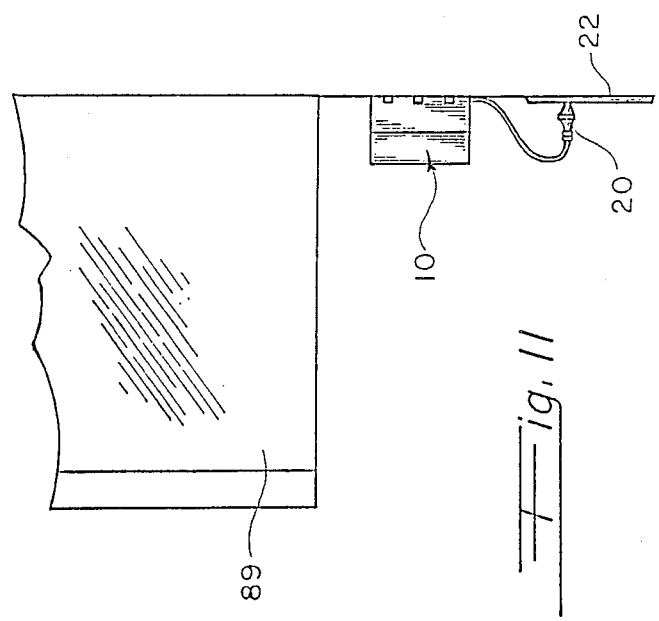
FIG. 11 is a schematic illustration of a wall mounting of the multistation modular charging system of the present invention.
Figure 10:
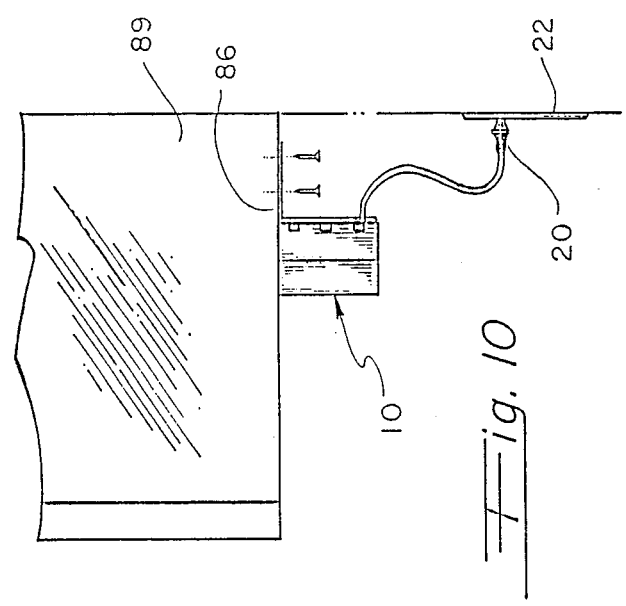
FIG. 10 is a schematic illustration of an under-the-cabinet mounting of the multistation modular charger of the present invention.

As shown in FIG. 10, the multistation modular charging system 10 of the present invention is mounted under a cabinet 84 by means of an auxiliary L-shaped member 86. Thus, the bosses 64 of each module are used to secure the L-shaped member 84 to the rear face of the module, and then the upper leg of the L-shaped member can be secured to the underside of the cabinet 84 by suitable bolts or screws. In FIG. 11, the multistation modular charging system 10 is mounted in a wall adjacent to a cabinet. However, any convenient mounting is feasible consonant with the teachings of the present invention.

Figure 12:
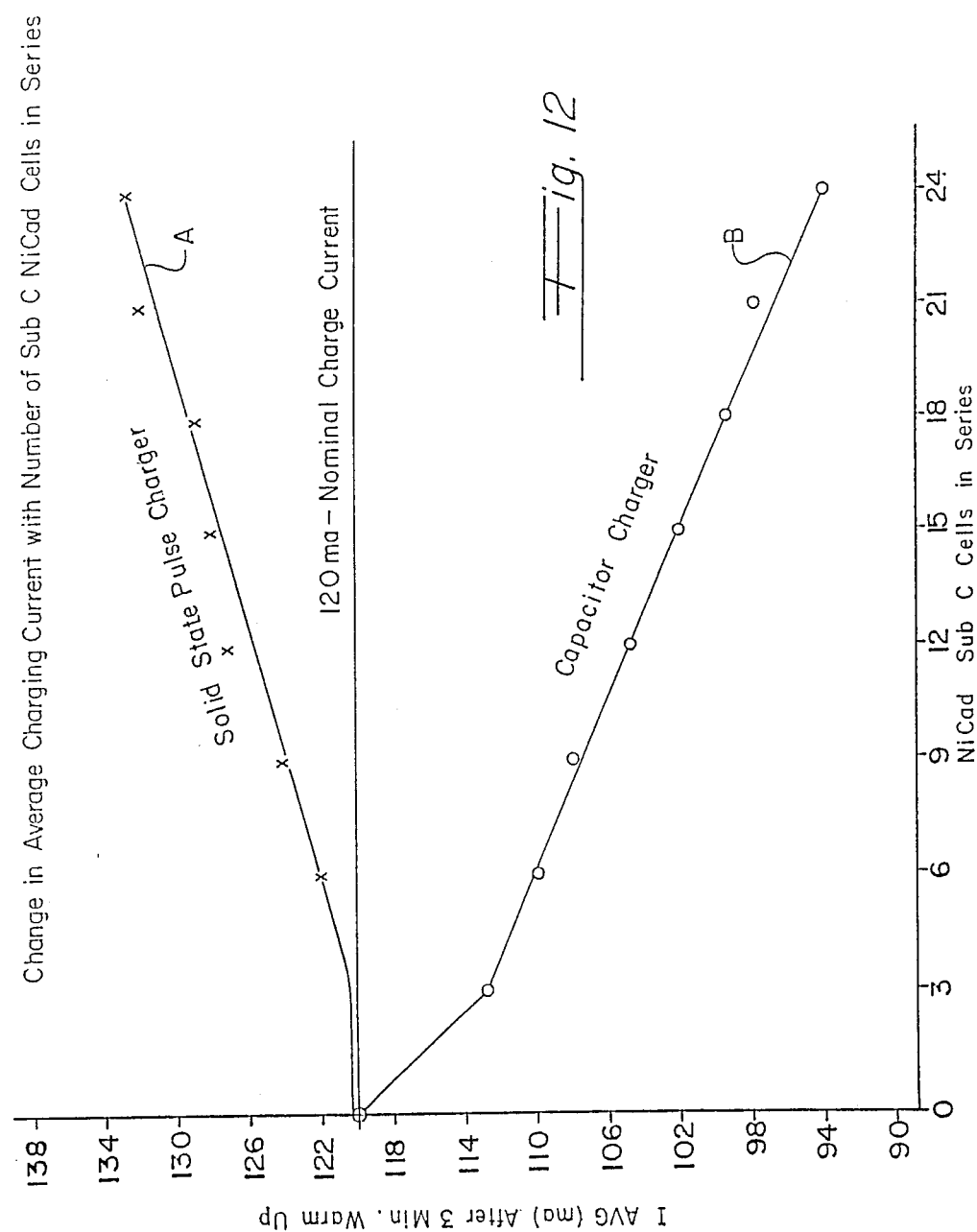
FIG. 12 is a graph depicting the performance of the system as disclosed in the above-mentioned parent application Ser. No. 682,195 of the present invention as distinguished from a capacitor type of charging circuit, and showing the average charging current per number of battery cells in series.

FIG. 12 is a graph illustrating the performance in terms of charging current vs. number of cells of the solid state current pulse charging system according to the invention and as used in the multistation modular array as herein described versus a conventional capacitor charger. It will be seen that the charging current for the system according to the invention, marked as A on the graph, increases as the number of cells increases in number, in this case twenty-four. As shown, the cells are conventional NiCad Sub-C cells connected in series. In the conventional charger using well known capacitor discharge methods, the average charging current actually decreases as the number of cells being charged in series increases.

A preferred second embodiment of a module, generally designated by the numeral 100, is shown in FIGS. 13A–13E and it may be used in a preferred realization of a multistation modular charging system of the present invention. Referring to FIGS. 13A–13D the preferred module 100 comprises two housing parts 101 and 102 constituting respectively a back half part and a front half part. The housing parts 101 and 102 form a "clamshell" type of housing in which complementary mating portions of the housing parts join at a common midplane 104. The housing parts 101 and 102 are fixedly connected to one another by a pair of screws which are counter sunk within respective bores 105 and 106 visible on the front housing part 102. The rear housing part 101 is provided with notches 107a and 107b along its top and bottom to provide ventilation openings for cooling purposes. The front part 102 of the housing is provided with access holes 103a and 109b therein to allow suitable fastener means (such as screws or "Molly" bolts) to secure the module 100 to a wall surface. A vertically extending arcuate surface 108 is provided on the outwardly facing front surface of the front part 102. This surface 108 is shaped to compliment a surface of a portion of a cordless device, preferably the handle thereof, so that the cordless device may be positioned thereon. On the left side of the module 100 near its top and bottom are a pair of slots 110 and 111. On the right side of the module 100, near the top and bottom are a pair of tongue members 112a and 113a having respective upstanding detent portions 112b and 113b. The module 100 is to be mechanically connected to an adjacent identical module simply by engaging its tongue members 112 and 113 in slots corresponding to the slots 110 and 111 of an adjacent module and so on until as great a number of modules as desired are assembled in a horizontal configuration, in much the same fashion as the embodiment illustrated in FIG. 1A. To assemble the modules, the tongue members 112 and 113 are designed to enter the slots 110 and 111 of an adjacent module to secure the adjacent modules to one another in removable locking engagement, the detent portions 112b and 113b preventing the modules from becoming accidentally disengaged. To disconnect one unit from the next, the tongues 112 and 113 are simply sprung respectively downwardly and upwardly by a tool, such as a screwdriver, inserted into the interior of the unit 100 via respective slots 116 and 119 (FIG. 13B) in the top wall of the unit, one slot 116 being visible in FIG. 13A near the slot 110. The similar slot 119 (FIG. 13B) is provided in the bottom wall of the unit 100 near the slot 111. The detent portions 112b and 113b of the tongue members 112a and 113a respectively come into sliding engagement with inclined surfaces 114 and 115, respectively when adjacent modules are being mechanically connected or disconnected. The inclined surfaces 114 and 115 are defined by integral portions of the parts 101 and 102 adjacent to the slots 110 and 111, respectively.

A hollow protuburance or boss 117 extends outwardly from an upper central area of the arcuate surface 108 and beyond the front surface of the front housing part 102. An opening 118 is provided suitably in a front surface of the hollow boss 117 for the purpose of receiving a contact-bearing member provided in a recess within a shaped portion, e.g. handle of a cordless device to be recharged. An downwardly extending flange 120 is provided on the boss 117.

A second hollow boss or protuburance 121 extends outwardly from the left side of the module 100. An opening 122 is provided within the protuburance 121 into the interior of the unit 100. A recessed bore 123 (FIGS. 13B, 13C) is provided within the right side of the module 100, this bore being aligned with the opening 122 and being so shaped, positioned and dimensioned that adjacent modules may be mechanically engaged one to the next with their respective protuburances 121 positioned within the respective bore 123 of the next unit.

Figure 13D:
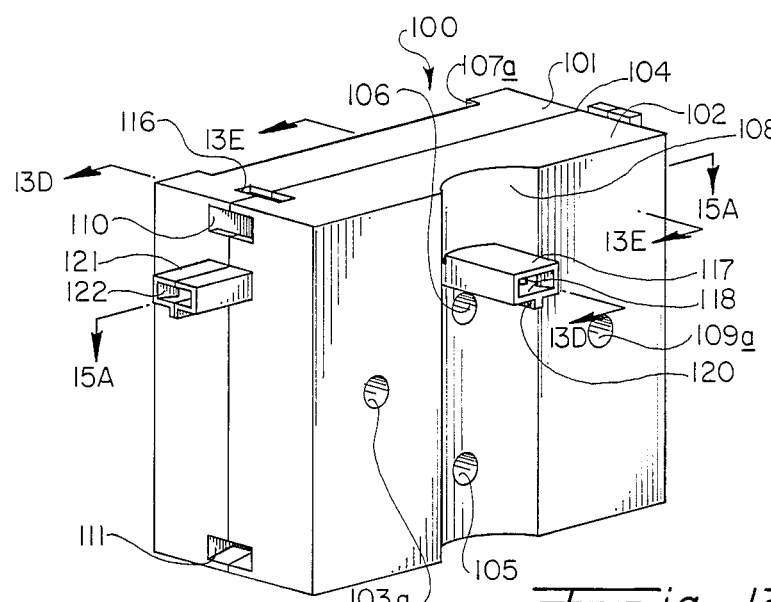
FIG. 13D is a cross-sectional view of the modular charger unit shown in FIG. 13A, the section being taken along section line 13D—13D, to illustrate how the two halves of the modular unit are connected together.

As seen in FIGS. 13B–13D, the back part 101 includes a pair of trusses 124 and 125, formed integrally therewith, which extend into the interior of the module 100, and the front part 102 includes a pair of trusses 126 and 127, formed integrally therewith, which extend into the interior of the module 100. The ends of the trusses 124–126 are respectively provided with end portions 124a–127a and 124b–127b which extend beyond the trusses 124–127 proper. The trusses 124–127 are positioned and dimensioned so that when the parts 101 and 102 are assembled, the end portions 124a, 124b of the truss 124 contact the end portions 126a, 126b of the truss 127 and the end portions 125a, 125b of the truss 125 contact the end portions 127a and 127b of the truss 127. Also extending outwardly from the interior walls of the back part 101 and the front part 102 are respective slotted support members 128 and 130, respectively, which with the trusses 124–127 serve to support a circuit supporting structure, when assembled as best seen in FIGS. 15A and 15B.

Referring briefly to FIG. 13D, a cross-sectional view of the unit 101 illustrated in FIG. 13A shows a pair of threaded bores 131 and 132 which extend through the back part 101 and are aligned with the screw-receiving bores 105 and 106 respectively. Respective screws 98 and 99 are threadedly engaged with the respective threaded bores 131 and 132 to fixedly connect the back and front parts 101 and 102 to one another.

Figure 14:
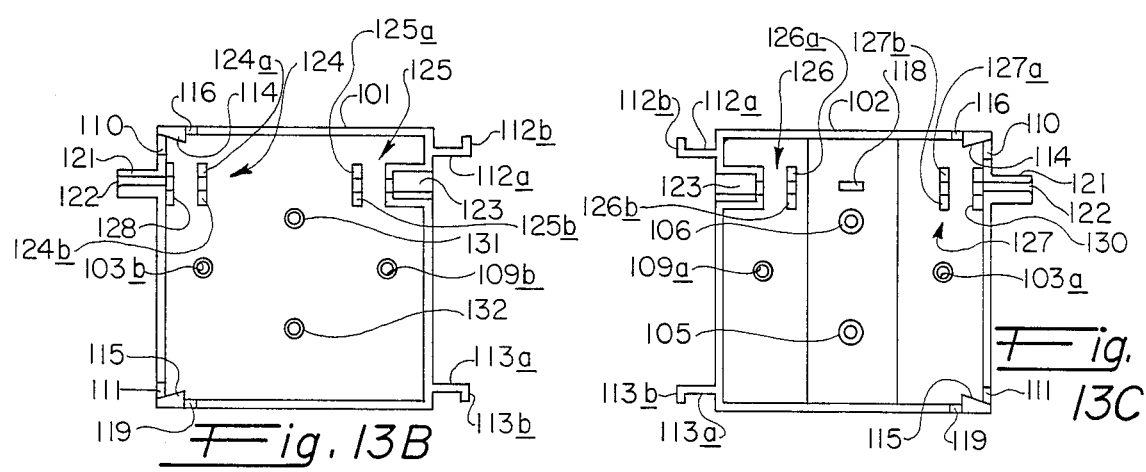
FIG. 14 is a plan view of the back of the modular unit illustrated in FIG. 13A, showing a possible alternative means for fixing the modular unit to a wall or the like using adhesive.
Figure 13E:
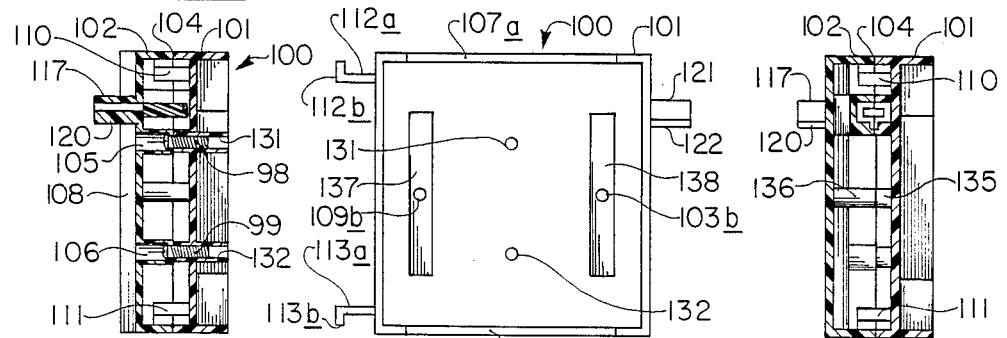
FIG. 13E is a cross-sectional view of the modular unit illustrated in FIG. 13A, the section being taken along section line 13E—13E to illustrate how the unit may be attached to a wall or the like using bolts.

In order to mount the unit 100 on a wall, screws or "Molly" bolts, not shown, may be inserted into the openings 103a and 109a in the front part 102 with the smaller diameter portion extending through bores within respective guides composed of two integral members, one of members 135, being visible in FIG. 13E is an integral portion of the back part 101. The front part 102 includes a further member 136 having a bore of somewhat larger diameter which is aligned with the smaller diameter in the guide 135. The bore within the guide 136 is of sufficient diameter to receive the head of a screw or "Molly" bolt and includes a land therein for providing a stop for the head of the screw or "Molly" bolt. The screws or "Molly" bolts extend outwardly from the back through holes 103b and 109b (FIG. 13B). An alternative technique for mounting the module 100 on a flat wall surface is illustrated in FIG. 14 which is a plan view of the back of the module 100, showing respective vertical lands 137 and 138 which having an adhesive material thereon to fix the module to the flat wall surface.

The circuit for distributing d.c. charging current to the cordless device is best seen in FIGS. 15A and 15B, to which specific reference is made. As shown, d.c. current carrying busses 141 and 142a and 142b are fixed to opposite surfaces of an insulating support 143. The busses 141, 142a and 142b may be fixed to the support 143 using conventional bonding techniques, such as sonic welding. The support 143, with its associated busses 141, 142a and 142b is positioned within the interior of the housing parts 101 and 102 on the trusses 124–127, the support 143 extending through slots defining by the abutting ends of the trusses 124–127. The trusses hold the support 143 against and prevent horizontal and vertical movement. Axial movement of the support 143 within the module 100 is prevented by integral extensions 144 and 145 which extend outwardly from the support 143 and are so positioned and dimensioned that they fit between each of the trusses 125 and 127 and inside surfaces of the right wall of the parts 101 and 102, respectively. The left end portion 146 of the support 143 is slightly enlarged, with the busses 141 and 142b extending outwardly beyond the support 143 to define a pair of normally closed spring contacts 147 which are positioned within the protuburance 121. The busses 142a and 142b extend outwardly from one surface of the carrier 143 to define a second pair of normally closed spring contacts 148 positioned within the hollow boss 117. The support 143 includes integral extensions 143a, 143b and 143c which aid in the positioning of the busses and the pair of contacts 147. End portions of the busses 141 and 142a shown toward the right in FIG. 15A are positioned slightly inward from the end and are fixedly spaced apart to receive respective contacts of a pair of normally closed spring contacts, such as the contacts 147 of an adjacent module or to receive a pair of similar contacts which carried on an end of a power cord, such as the resistive line cord shown in FIG. 16A.

Turning to FIG. 16A, an exemplary preferred line cord and end connectors (plugs) particularly suitable for use in conjunction with the module unit 100 illustrated in FIGS. 13A–13E, 15A and 15B and as component of a multistation charging system using a plurality of such units includes a two lead resistive line cord 160 having a plug 161 on one end thereof having a pair of blades 162 and 163, which are to be inserted into a conventional a.c. wall outlet. The plug 161 is preferably made of a conventional plastics material molded so as to include fins 164 on its outer surface to aid in cooling. An encapsulated, integrated, circuit 165 is molded within the plug 161 on a heat-conductive member 166, which may perform heat sink functions as well. In order to aid in heat dissipation, one or more heat conductive members extend from the encapsuled circuit 165 and its heat sink 166 to one or more of the fins 164 to effect better heat transfer, one such member 167 being shown for purpose of illustration. One of the blades 162 in the plug 161 is directly conductively connected to one of the resistive leads within the cord 160, the other blade 163 is connected to the input side of the integrated circuit 165. The output side of the current regulated, current pulse producing circuit 165 is conductively connected to the other resistive lead within the cord 160. The other ends of the respective leads within the cord are connected to respective spring contacts 168 and 169 constituting a pair of contacts 170 housed within and shrouded by a shaped housing 171 molded of a plastics material. The one resistive lead in the cord 160 extending from the circuit 165 to the contact 168 is connected thereto via a circuit protecting device such as a fuse 169 housed within the shaped housing (plug) 171. If desired, a light emitting device or lamp 172 could also be provided in series with the fuse 169 so a user could visually determine if the system is in operation, the lamp being visible via an aperture 173 in the housing 171. A rectifier diode 174 is provided within the plug 171 in series with the lamp 172 and fuse 177. The diode 174 is part of the current regulated current pulse producing circuit, which also includes the integrated circuit 165 and the resistive leads within the line cord 160. The spring contacts 168 and 169 are fixed to opposite sides of an insulating support 175 supported within the housing 171.

When a user wishes to supply d.c. charging current pulses to the modular charger unit 100, he needs only to insert the shaped housing 171 (FIG. 16A) into the bore 123 (FIGS. 13B, 13C and 15A, 15B)) which is dimensioned and shaped to complement the housing 171. As a result, the contacts 168 and 169, which are normally closed, are spread apart, and come into engagement with the bosses 141 and 142a, respectively; thus d.c. charging current pulses from the d.c. pulse producing circuit, constituted by the integrated circuit 165, diode 174 and the resistive line cord 160, are supplied to the module 100 and to a battery or batteries within a cordless device positioned as required on the module 100 with its current receiving contacts in electrical connection with the pair of contacts 148. Similarly, were a plurality of identical modules connected electrically and mechanically, as indicated above, to constitute a multistation system, a plurality of cordless devices could be recharged.

The shaped housing 171, on the output end of the line cord 160 desirably may be so dimensioned and shaped, and the normally closed pair of spring contacts 168 and 169 so positioned, with respect to the recess 80 (see FIG. 7) in the handle 75 of a tool or appliance to be recharged, the shaped housing 171 can be inserted into the recess 80 to recharge the battery or batteries within one device even when it is not in place on the multistation charger. It is to be appreciated that the shape and dimensions of the housing 171 and the recess 80 can differ from those illustrated, it being required only that the two parts be complimentary.

The pair of contacts 170 could, if desired, be normally open, were one to wish to prevent current flow when the plug defined by the housing 171 has not either been inserted into a device or be charged or into a module or multistation charging system having one or more devices to be recharged in place.

Figure 16B:
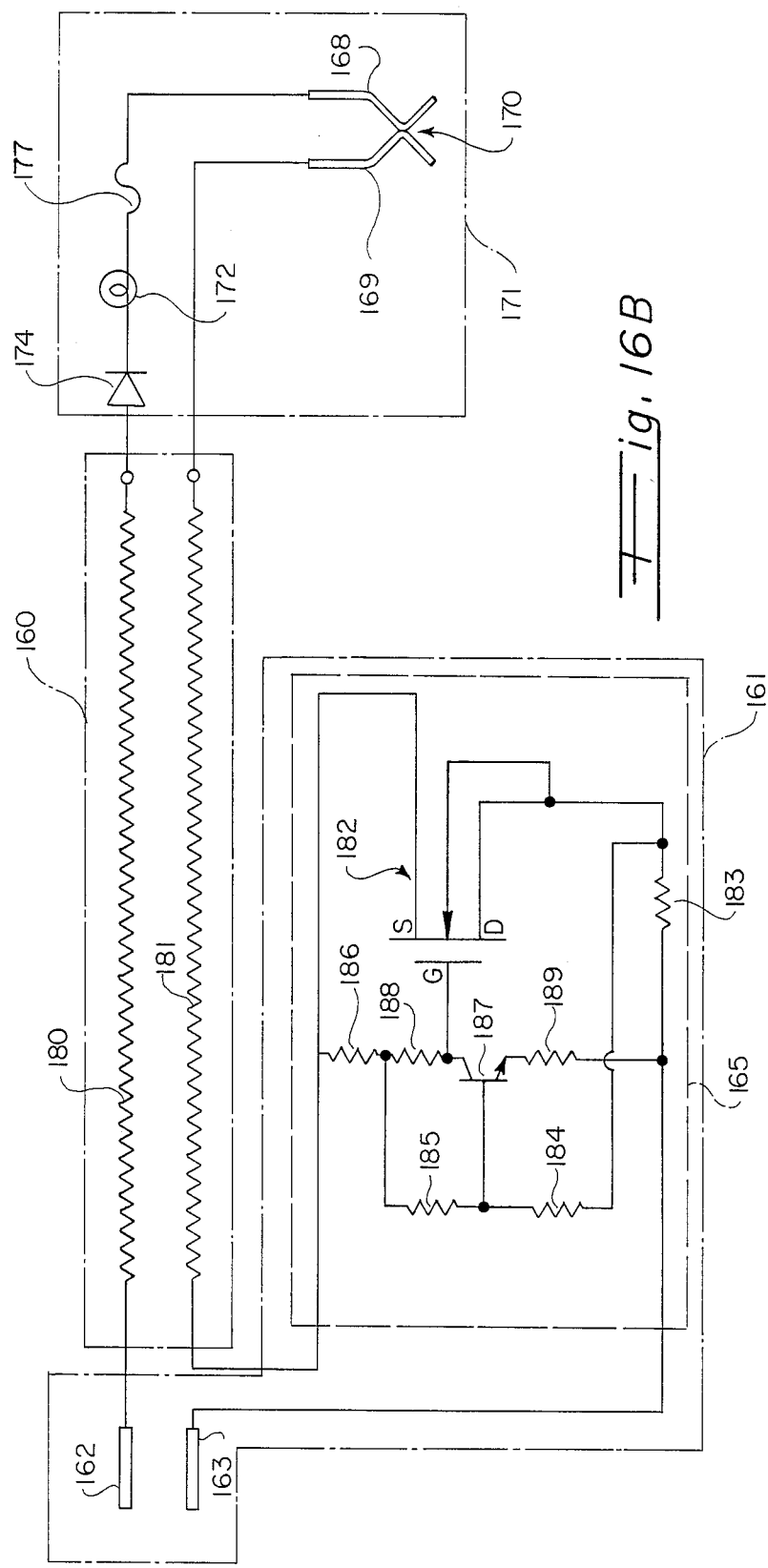
FIG. 16B is a schematic diagram of the line cord, and circuit components of FIG. 16A, the plugs being shown diagramatically as dashed lines.

A simplified schematic drawing of the circuit composed of the structure illustrated in FIG. 16A is shown in FIG. 16B, the line cord 160 being shown in phantom with its resistive leads 180 and 181 being shown in schematic representation, the lead 180 extending from the blade 162 to one terminal of the rectifying diode 174, its other terminal being connected to one terminal of the lamp 172. The other terminal of the lamp 172 is connected to one terminal of the fuse 177, its other terminal being conductively connected to the spring contact 168 of the pair of contacts 170. The other contact 169 of the pair of spring contacts is conductively connected to one end of the resistive lead 181. The other end of the resistive lead 181 is conductively connected to the source electrode S of a MOSFET 182 having its drain electrode D connected to the blade 163 of the plug 161, via a first resistor 183, which serves as feedback resistor. Second, third and fourth resistors 184–186 are connected in series between the connection between the drain electrode of the MOSFET 182 and the end of the resistive lead 182 which is connected to the source electrode S of the MOSFET 182. The circuit point between the second resistor 184 and the third resistor 185 is connected to the base electrode of an npn control transistor 187, which has its collector conductively connected, via a fifth resistor 188, to the circuit point between the third and fourth resistors 185 and 186. The circuit point between the collector of the transistor 185 and the fifth resistor 188 is conductively connected to the gate electrode G of the MOSFET 182. A sixth resistor 189 is connected between the emitter of the transistor 187 and that end of the feedback resistor 183 which is conductively connected to the blade 163. The MOSFET 182 desirably has a relatively high transconductance (G) of approximately 2 mhos, while the transistor 187 desirably has a relatively high gain ($\beta$) of about 100. It is to be appreciated that other current pulse producing circuits, such as circuits of the type disclosed in the application of Holland, supra, could be used to form the integrated circuit 165 were the rectifying diode formed as a discrete circuit component apart from those portions which are integrated, the diode being positioned in the housing or plug 171, while the remaining components would be in the plug 161, shown in FIG. 16B diagramatically or dashed lines.

It is to be understood that a hybrid circuit may be substituted for the integrated circuit 165. The MOSFET 182 may be formed as a discrete component, the remaining components being provided as an integrated circuit, the thus modified circuit being encapsulated and thereafter molded within the plug 161.

Figure 18:
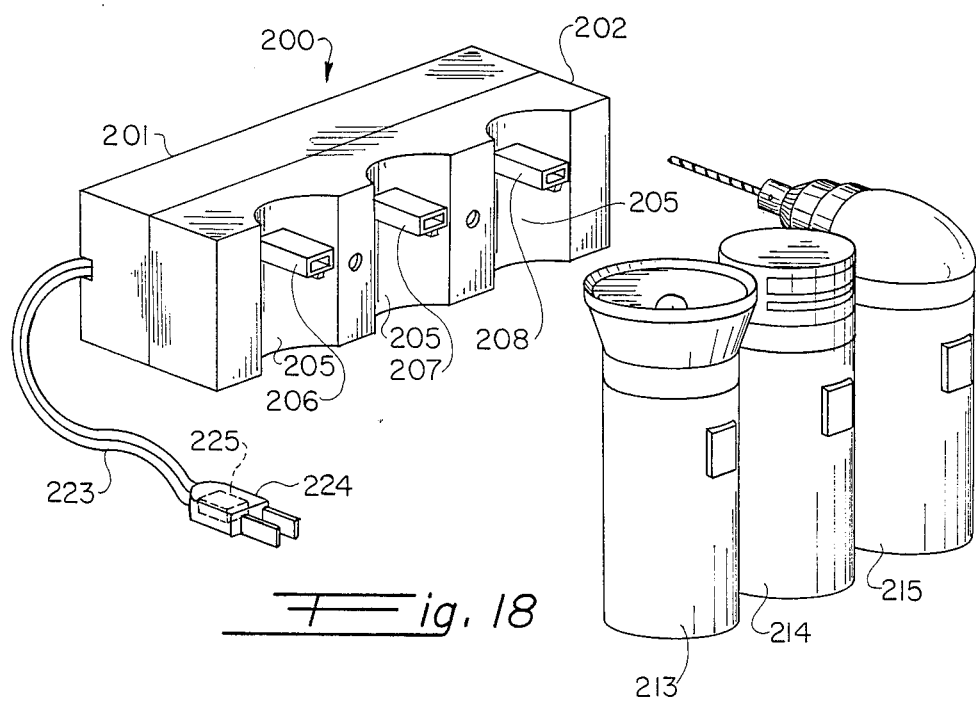
FIG. 18 is a simplified pictorial view of a variant of the third embodiment of a modular charging system having multiple charging stations, with associated cordless devices, which may be found in a home workshop or the like, and a power cord being shown, in accordance with the present invention.
Figure 19:
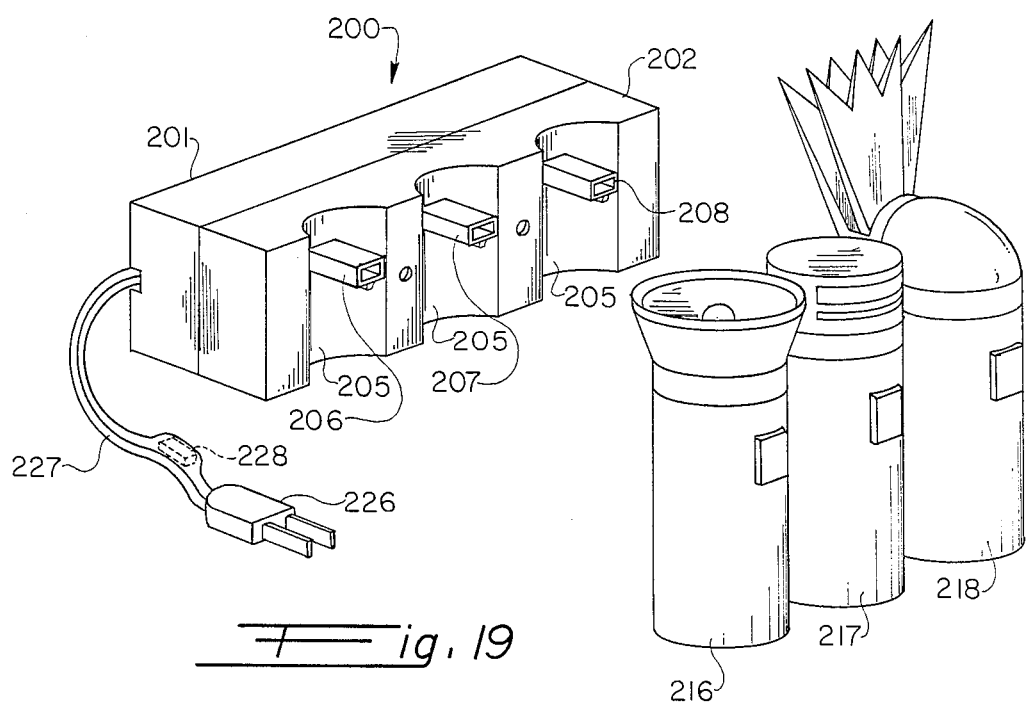
FIG. 19 is a simplified pictorial view of a variant of the third embodiment of a modular charging system having multiple charging stations, with associated cordless devices, which may be found in a storage area for lawn care tools or the like, in accordance with the present invention.

It is to be appreciated that the individual charger modules could be individually configured to provide more than one charging station on its front surface. These individual units could constitute a multistation charging system when connected to a d.c. charging current source. Three such systems, are respectively illustrated, in three variant embodiments, in FIGS. 17–19. In each case, the systems include a multistation charger unit 200 constituted by a back part 201 and a front part 202. As illustrated, three vertically extending, arcuate shaped surfaces 205 are provided to receive complimentary shaped portions of cordless devices containing batteries to be recharged. Three respective bosses 206–208, each provided with a respective central aperture and downwardly extending flange corresponding to the opening 118 and flange 120 shown in FIG. 13A. Cordless devices 210–212, which are exemplary for use in a kitchen or the like, are illustrated respectively as a cleaning brush, radio, and egg beater in FIG. 17. In FIG. 18, cordless devices 213–215 are shown respectively as a flashlight, radio and powered drill, devices such as one may use in a metal or wood working shop. In FIG. 19, a flashlight 216, a radio 217 and a powered clipper 218 are shown, all cordless devices one could use in connection with outside lawn work or the like. A similar arrangement could be provided for use in a bathroom or personal care area.

Figure 17:
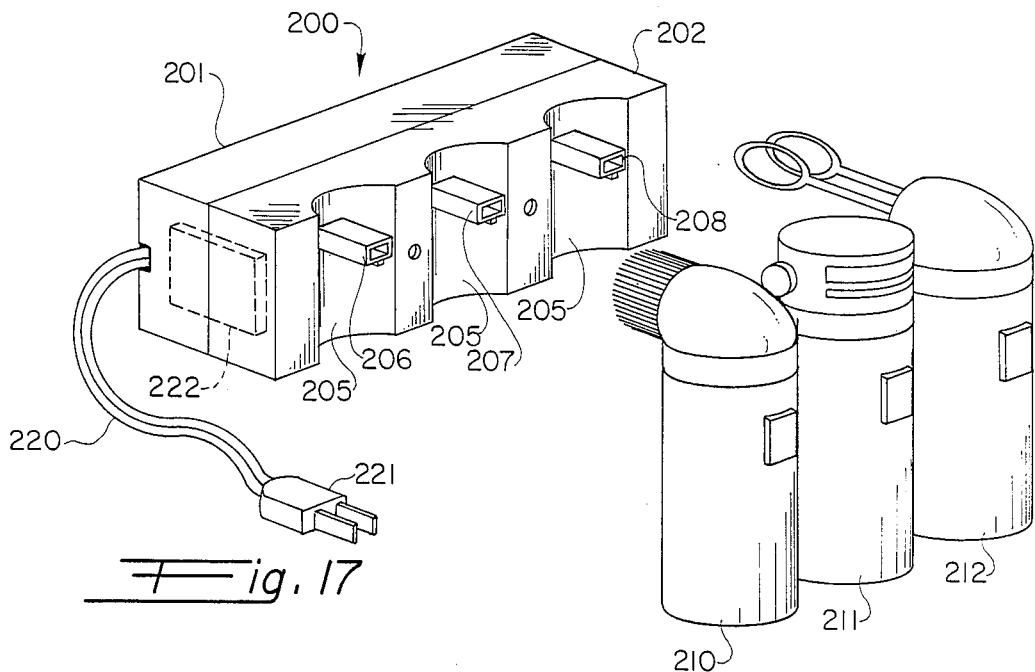
FIG. 17 is a simplified pictorial view of a third embodiment of a modular charging system having multiple charging stations, with associated cordless kitchen appliances and a power cord being shown, in accordance with the present invention.

As illustrated in FIG. 17, a resistive line cord 220, which extends into the unit 200 and has a conventional plug 221 on an end thereof is used to supply a.c. power to a current regulated, current pulse producing circuit 222 housed within the unit 200 and to supply d.c. current pulses to a series circuit having contacts arranged substantially as disclosed in the system embodiments discussed above and illustrated respectively in FIGS. 1–12 and in FIGS. 13A–13E, 15A, 15B. As shown in FIG. 18, power may be supplied to the unit 200 via a resistive line cord 223 having a wall outlet engaging plug 224 on an end thereof, a current regulated, current pulse producing circuit 225 being encapulated within the plug 224 in the fashion discussed above in conjunction with FIG. 16A. As shown in FIG. 19, a conventional plug 226 is provided on one end of a resistive line cord 227, a current regulated, d.c. circuit pulse producing circuit being positioned within the resistive line cord 228. While the entire current regulated, current pulse producing circuitry, including the rectifier, could be positioned within the plug 226 (FIG. 18) or in the line cord 227 (FIG. 19), the rectifier could be positioned in the unit or within a plug (now shown) in the fashion illustrated in FIG. 16A, the unit 200 in these cases being modified to receive such a plug.

Obviously, many modifications may be made without departing from the basic spirit of the present invention. Accordingly, within the scope of the appended claims, the invention may be practiced other than has been specifically described therein, its scope being defined by the appended claims.

What is claimed is:

1. A multistation modular charging system for charging a plurality of units, each of which has at least one rechargeable battery therein and at least one electric contact means therein for conducting d.c. current to the at least one rechargeable battery, the charging system comprising an electrically conductive series circuit having a plurality of normally closed pairs of contacts, each of said pairs of contacts being in electrical series with each other of said pairs of contacts; a power source; a charging means receiving current from said power source, said charging means being connected to said electrically conductive series circuit; and a plurality of modules including circuitry for completing said electrically conductive series circuit, each of said modules having therein at least one pair of said plurality of normally closed pairs of contacts, each of the units having a respective said at least one electrical contact means connected to the respective at least one rechargeable battery therein, each of said modules having a releasable connection means for incorporating the respective electrical contact means of respective said units, when the units are in place, into said electrically conductive series circuit via respective pairs of said normally closed pairs of contacts by effecting opening thereof, at least all of said modules other than one constituted by a last module of said plurality of modules having a respective further normally closed pair of contacts, at least all of said modules other than one constituted of a first of said plurality of modules having further contact means for engaging a respective one pair of said further normally closed pairs of contacts in an adjacent one of said modules; whereby rechargeable batteries within the units may be placed in series with said electrically conductive series circuit and each other to be charged by the d.c. current flowing in the series circuit.

2. The multistation modular charging system according to claim 1, wherein said last module has a pair of additional normally closed pair of contacts and at least all of said modules other than the first and last thereof have a respective one of said further contact means engaging a respective one of said further normally closed pair of contacts in an adjacent one of said modules, said additional normally closed pair of contacts being provided so that an additional module may be added.

3. The multistation modular charging system according to claim 2, wherein said first module has an additional contact means therein for receiving d.c. current for delivery to the electrically conductive series circuit, said additional contact means being substantially similar to said further contact means; and wherein all of the modules are interchangeable.

4. The multistation modular charging system according to claim 3, wherein all of the modules are substantially identical.

5. The multistation modular charging system according to claim 1, wherein said first module has an additional contact means therein for receiving d.c. current for delivery to the electriclly conductive series circuit.

6. A charging system according to claim 1, wherein one of said modules is a base module, the system further comprising a line cord and plug to be connected to the power source.

7. A charging system according to claim 6, wherein said charging means at least partially is disposed in said plug.

8. A charging system according to claim 6, wherein said charging means is at least partially disposed in a portion of said line cord.

9. A charging system according to claim 1, wherein said charging means comprises a solid-state device generating a series of current pulses to charge the respective batteries in the units, said solid-state device being current regulated.

10. A charging system according to claim 1, wherein each of said modules includes latching means for securing said modules in abutting relationship with one another in a linear array thereof.

11. A charging system according to claim 1, wherein said series circuit includes a pair of conductor strips in each of said modules.

12. A charging system according to claim 1, wherein said charging means comprises a current regulated, d.c. current pulse producing circuit.

13. A multistation modular charging system for charging a plurality of cordless devices such as tools, appliances or other battery powered units from a power source, comprising a base module, a line cord associated with the base module, means for connecting the line cord to the power source, a solid state charging device electrically connected to the line cord and the power source and generating a plurality of charging current pulses, first normally closed spring contact means carried by the base module, means on the base module for supporting a first cordless device, said last-named means including means for electrically engaging the first normally closed spring contact means to receive charging current for charging the first cordless device, at least one satellite module laterally of the base module, means for mechanically supporting the satellite module on the base module, second normally closed spring contact means carried by the satellite module and in series with the first normally closed spring contact means, means including respective further normally closed spring contact means in each of said modules for completing the series circuit, and means on the satellite module for supporting a second cordless device, said last-named means including means for electrically engaging the second normally closed spring contact means to receive charging current for charging the second cordless device.

14. The multistation modular charging system according to claim 13, wherein said solid state charging device comprises a current regulated, d.c. current pulse producing circuit.

15. A multistation modular charging system for charging a plurality of cordless devices such as tools, appliances or other battery powered units comprising a base module, means for supporting the base module on a wall or other surface, charging means associated with the base module, a plurality of substantially identical satellite modules, means for removably connecting one of the satellite modules to the base module laterally thereof, means for removably securing the remaining satellite modules to each other and to the one satellite module and hence to the base module, in sequence, and progressively laterally thereof in a direction away from the base module, respectively normally closed contact means in the base module and in each of the satellite modules and including a respective pair of spring contacts normally engaging one another, means including further normally closed contact means in each of said modules for connecting the first said respective normally closed contact means in series with each other as the satellite modules are connected sequentially to each other and to the base module and for completing the series circuit, means on the base module and on the satellite modules, respectively, for supporting the respective cordless devices and adapted to engage and to be received between the respective spring contacts in electrical engagement therewith when the respective cordless device is supported on the base module or on one of the satellite modules, whereby the cordless devices may be charged simultaneously by the charging means, and whereby all of the cordless devices are charged in electrical series.

16. The multistation modular charging system according to claim 15, wherein said charging means comprises a current regulated, d.c. current pulse producing circuit.

17. A multistation modular charging system for charging a plurality of cordless devices such as tools, appliances or other battery powered units from a power source, comprising a plurality of modules, at least some of which are substantially identical, means for removably connecting the modules together in sequence, electrical contact means within each of the modules, means including a respective pair of normally closed spring contacts in each of said modules for serially connecting the respective electrical contact means as the modules are connected together, adjacent ones of said modules having cooperating mechanical securing means adapted to engage each other as the respective electrical contact means are serially connected, charging means connected between the power source and the electrical contact means on at least one of the modules, means on each module for supporting a respective cordless device, each of the electrical contact means including a pair of additional normally closed spring contacts, and conductive rod means carried by each of the cordless devices and adapted to engage and to be received between the respective additional normally closed spring contacts in electrical engagement therewith when the respective cordless device is supported on a selected one of the modules.

18. The multistation charging system according to claim 17, wherein said charging means comprises a current regulated, d.c. current pulse producing circuit.

19. A multistation modular charging system for charging a plurality of cordless devices such as tools, appliances or other battery powered units from a power source, comprising a base module having a line cord connected to the power source, a charging device operatively associated with the base module, means on the base module for storing an excess portion of the line cord, means for supporting a first cordless device having a first electrically conductive means therein to carry d.c. charging current to at least one rechargeable battery therein on the base module, first electrical contact means in said base module for providing a conductive d.c. current path between the charging device and the first electrically conductive means in the first cordless device, a satellite module, means for mounting the satellite module on the base module, second electrical contact means in the satellite module for providing a conductive d.c. current path, means including a pair of normally closed spring contacts in said base module and a pair of fixed contacts in said satellite module which engage and spread said pair of normally closed spring contacts for connecting the second electrical contact means in electrical series with the first electrical contact means and with the charging device operatively associated with the base module, means for supporting a second cordless device having a second electrically conductive means therein to carry d.c. charging current to at least one rechargeably battery therein, and electrical connection means within said base module and within said satellie module providing a series connection between the second electrical contact means within the satellite module and the second electrical contact means within the base module.

20. The multistation modular charging system according to claim 19, wherein said charging device comprises a current regulated, d.c. current pulse producing circuit.

21. In a multistation charging system for charging a plurality of units from an alternating current source, each of the units having at least one rechargeable battery therein, the combination of a plurality of charging stations arranged substantially adjacent to one another, respective first normally closed electrical contact means in each of the charging stations, means including respective second normally closed electrical contact means in each of said charging stations for connecting the first normally closed respective electrical contact means in all of the adjacent charging stations in an electrically conductive series circuit with each other, means operatively associated with one of the charging stations for connecting the electrically conductive series circuit including the respective electrical contact means therein to the current source, said last-named means including a charging device having a current regulating circuit and generating a series of charging current pulses, means on each of the charging stations for removably supporting a respective one of said plurality of units, and means on each unit for electrically connecting the respective battery therein within the electrically conductive series circuit and in series therewith and in series with other batteries within the series circuit.

22. The combination of claim 21, wherein each of the charging stations comprises a respective module.

23. The combination of claim 21, wherein the charging stations are arranged laterally of one another.

24. The combination of claim 21, further including means for removably latching the charging stations together.

25. The combination of claim 21, wherein the charging device comprises an integrated circuit.

26. The combination of claim 21, wherein each of the units comprises a cordless battery-operated device having a substantially cylindrical handle, and wherein the means for removably supporting the cordless device comprises, in each of the charging stations, a respective shaped recess formed therein for receiving the handle of the cordless device, a protruding boss formed on the recess, and the handle having a complementary recess formed therein for receiving the boss.

27. The multistation charging system according to claim 26, wherein said charging device comprises an integrated circuit.

28. In a multistation charging system for charging a plurality of units from an alternating current source, each of the units having at least one rechargeable battery therein, the combination of a plurality of charging stations arranged substantially adjacent to one another, electrical contact means in each of the charging stations, means including a respective pair of normally closed spring contacts in each of the stations for connecting the respective electrical contact means in the adjacent charging stations in a series circuit arrangement with each other, means on one of the charging stations for connecting the respective electrical contact means therein to the current source, said last-named means including a solid-state charging device having a current regulating circuit and generating a series of current pulses, means on each of the charging stations for removably supporting a respective unit, and means on each unit for electrically connecting the respective at least one rechargeable battery therein within the series circuit arrangement, wherein each of the units comprises a cordless battery-powered device having a substantially cylindricl handle, and wherein the means for removably supporting a respective unit comprises at each of the charging stations a scalloped recess formed therein for receiving the handle of the cordless device and a protruding boss formed on the recess, the handle having a complementary recess formed therein for receiving the boss, and wherein the means on each unit for electrically connecting the respective at least one rechargeable battery therein within the series circuit arrangement comprises a rod carried by the handle within the recess therein, a pair of conductive strips on the rod, means for electrically connecting the respective battery between the pair of conductive strips, the electrical contact means in the respective charging station comprising a pair of substantially parallel conductive strips, one of the pair of strips comprising respective elements normally engaging one another and resiliently biased towards each other, and the rod being inserted between the respective elements such that the conductive strips on the rod engage the respective elements.

29. The multistation charging system according to claim 28, wherein said solid-state charging device comprises an integrated circuit.

30. A modular system for charging batteries in cordless devices such as tools or the like, the system comprising housing means having a plurality of shaped recesses formed therein; a plurality of cordless devices, each of which has a shaped portion adapted to be received in the respective recesses and supported therein;

at least one battery in each of the devices, each of the shaped portions having an opening therein; a respective boss associated with each of the recesses and adapted to be received within a respective said opening in a respective said shaped portion, thereby removably supporting a respective said cordless device within its associated said recess in the housing means; respective pairs of spaced apart contacts within each of the shaped portions and associated with its respective said opening therein; a respective pair of normally closed contacts associated with a respective said boss in each of the respective recesses in the housing means, such that when the shaped portion of a respective cordless device is removably received within one of the respective recesses in the housing means, the respective boss fits within the respective opening in the shaped portion, and the respective spaced apart contacts spring the contacts of a respective said normally closed pair of contacts apart and engage these contacts in electrical series therewith; normally conductive means for electrically serially connecting the pairs of normally closed contacts; and current regulated charging means for supplying a series of battery charging current pulses to the serially connected normally closed pairs of contacts in the housing via said normally conductive means; whereby batteries within the devices may receive, via the spaced apart contacts and the normally conductive means, the charging current pulses.

31. The modular system according to claim 30, wherein at least some of said shaped portions of said devices are constituted by a respective handle of respective said devices.

32. The modular system according to claim 31, wherein the respective said at least one battery is carried within the respective said handle.

33. The modular system according to claim 30, wherein said recesses are substantially identical to each other and said shaped portions are substantially identical to each other.

34. The modular system according to claim 30, wherein said current regulated charging means comprises an integrated circuit.

35. A modular system for cordless devices such as tools or the like, comprising a housing, the housing having a plurality of substantially identical recesses formed therein, a plurality of cordless devices, each of which has a handle portion adapted to be received interchangeably in the respective recesses and supported therein, a battery in each of the handles, each of the handles having an opening therein, a protuberance associated with each of the recesses and adapted to be received within the opening of a respective handle, thereby removably supporting the respective cordless device within its recess in the housing, first spaced contacts carried by each of the handles and associated with its respective opening therein, second, normally closed contacts associated with the protuberance in the respective recess in the housing, such that when the handle of a respective cordless device is removably received within the recess in the housing, the protuberance fits within the opening in the handle, and the first spaced contacts spring the second, normally closed contacts apart and engage these second contacts in electrical series therewith, normally conductive means for serially connecting the respective second, normally closed contacts in the plurality of recesses in the housing, and current regulated charging means for supplying a series of battery charging pulses to the serially connected second, normally closed contacts in the housing via said normally conductive means.

36. The modular system according to claim 35, wherein said current regulated charging means comprises an integrated circuit.

37. A modular system for cordless battery powered devices, the system comprising housing means having a plurality of substantially identical recesses formed therein, a corresponding plurality of cordless, battery-powered devices removably and interchangeably mounted in the respective recesses, means for mechanically supporting the devices within the recesses, charging means associated with the system, the charging means delivering a series of charging current pulses, the charging means including current regulating means for regulating d.c. charging current, means independent of the mechanical supporting means for establishing electrical contact between the charging means and batteries within the respective cordless, battery-powered devices when the devices are received within the respective recesses in the housing means, means for establishing electrical communication between the charging means and batteries, the means for establishing electrical communication including respective normally closed pairs of contacts, and normally conductive means for connecting said respective normally closed pairs of contacts in electrical series with the charging means; whereby the batteries within the devices may be recharged.

* * * * *